United States Patent [19]

Rohrmoser

[11] Patent Number: 5,498,017
[45] Date of Patent: Mar. 12, 1996

[54] MONITORING AND/OR CONTROLLING DEVICE FOR A COUPLING DEVICE BETWEEN A BOOT AND A PIECE OF SPORTS APPARATUS IN PARTICULAR SKI BINDING

[75] Inventor: Alois Rohrmoser, Wagrain, Austria

[73] Assignee: Varpat Patentverwertungs AG, Littau, Switzerland

[21] Appl. No.: 106,430

[22] Filed: Aug. 13, 1993

[30] Foreign Application Priority Data

Aug. 19, 1992 [AT] Austria .................................. 1674/92

[51] Int. Cl.⁶ .......................... A63C 9/088; A63C 11/00
[52] U.S. Cl. .......................... 280/633; 280/617; 280/816; 280/612
[58] Field of Search .................................. 280/611, 612, 280/617, 618, 633, 809, 816

[56] References Cited

U.S. PATENT DOCUMENTS

| | | | |
|---|---|---|---|
| 4,311,321 | 1/1982 | Svoboda | 280/611 |
| 4,349,212 | 9/1982 | Svoboda | 280/816 X |
| 4,502,146 | 2/1985 | D'Antonio | 280/612 X |
| 4,917,399 | 4/1990 | Holzl | 280/809 X |
| 5,085,453 | 2/1992 | Bildner | 280/633 X |
| 5,192,090 | 3/1993 | Damborsky | 280/633 X |
| 5,236,218 | 8/1993 | Rohrmoser | 280/633 X |
| 5,261,688 | 11/1993 | Rohrmoser | 280/633 X |

FOREIGN PATENT DOCUMENTS

| | | | |
|---|---|---|---|
| 2736600 | 2/1979 | Germany | 280/816 |
| 3343047 | 6/1984 | Germany . | |

*Primary Examiner*—Brian L. Johnson
*Attorney, Agent, or Firm*—Collard & Roe

[57] ABSTRACT

A monitoring and/or controlling device (31) for a coupling device (6) between a boot (3) and a piece of sports apparatus (1), in particular a ski binding for a ski. The monitoring and/or controlling device (31) is provided with a visible and/or acoustic display device (28), a measuring device (26) and an energy source. The measuring device (26) cooperates with a coupling device, the release mechanism of which being adjustable to different release forces for the release of the boot or the piece of sports apparatus and/or the boot. The measuring device (26) is built to record the position of the coupling device (6) and/or the coupling elements (7', 8') of the coupling device (6) relative to one another and/or relative to the ski (2) or to the boot (3).

27 Claims, 14 Drawing Sheets

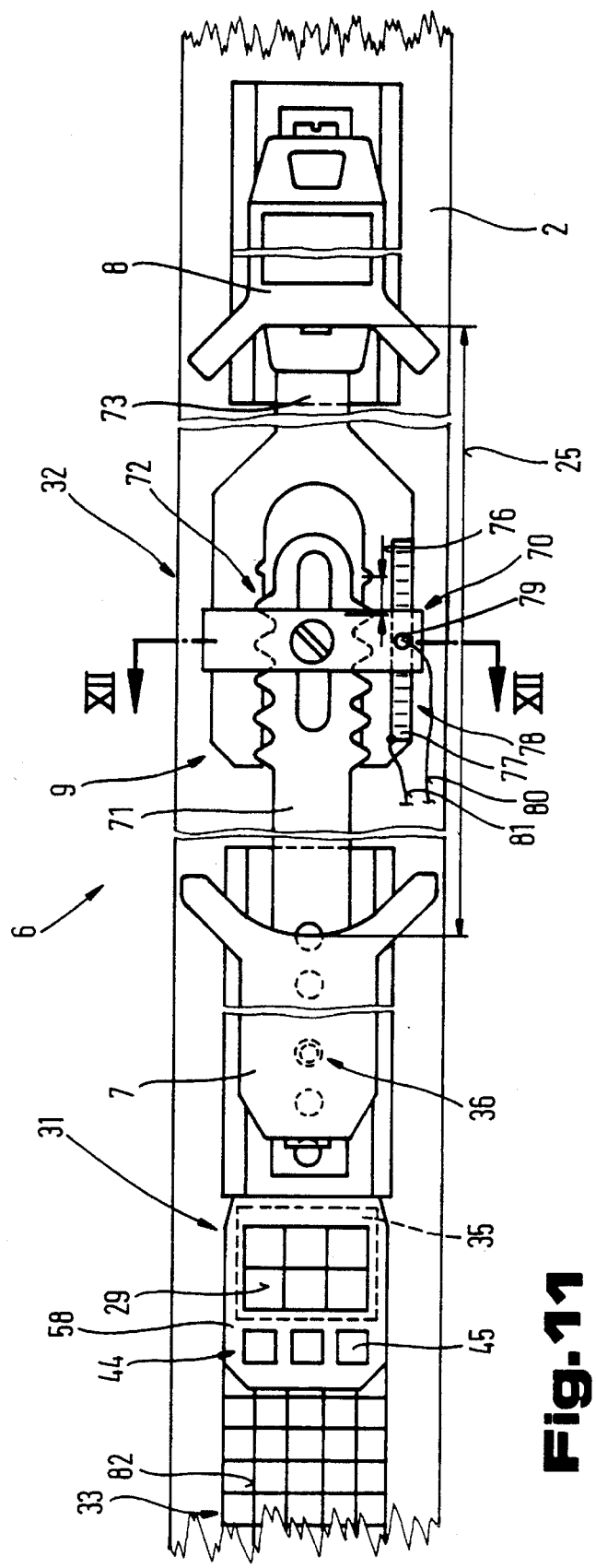
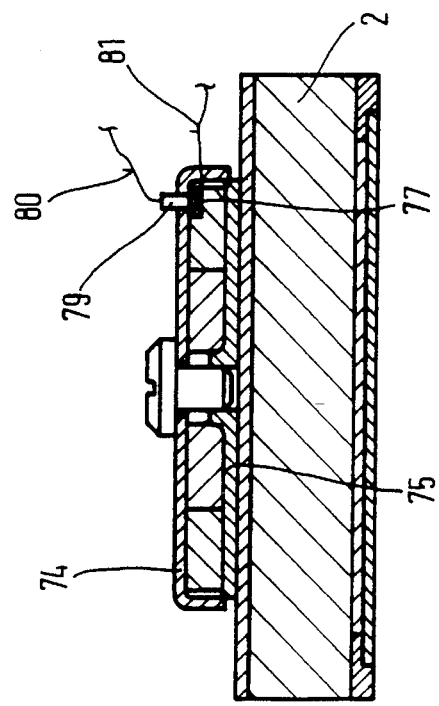
Fig. 11
Fig. 12

5,498,017

MONITORING AND/OR CONTROLLING DEVICE FOR A COUPLING DEVICE BETWEEN A BOOT AND A PIECE OF SPORTS APPARATUS IN PARTICULAR SKI BINDING

BACKGROUND OF THE INVENTION

1. Field of the Invention

The present invention relates to a monitoring and/or controlling device for a coupling device between a boot and a piece of sports apparatus, in particular a ski binding for a ski, with a visible and/or acoustic display device, a measuring device working together with a coupling device with a release mechanism being adjustable for different release forces in order to release the boot or the piece of sports apparatus and/or the boot, and with an energy source.

2. The Prior Art

Coupling devices between a boot and a piece of sports apparatus are already known, in particular ski bindings, which are equipped with a monitoring and/or controlling device. With the help of such monitoring and/or controlling devices it can be determined by various measuring devices whether or not a release force between the piece of sports apparatus and the boot can be determined in advance, which should lead to an automatic opening of the coupling device in order to protect the user of the piece of sports apparatus from injuries, in particular broken legs. These types of monitoring and/or controlling devices are very complicated and require a lot of computational processing. In addition, it gives the user no information whatsoever about the proper use or function of the coupling device between the piece of sports apparatus and the boot.

Furthermore, it is also known already to arrange monitoring and/or controlling devices on sporting goods, to provide for example the speed of a skier when he passes by at check-points, or the release of timekeeping processes.

SUMMARY OF THE INVENTION

The object of the present invention is to create a monitoring and/or controlling device for a coupling device between a piece of sports apparatus and a boot, which provides the user, especially when he puts the piece of sports apparatus into operation or the service man during maintenance, in particular when he fixes the boot on the piece of sports apparatus, with the necessary information and thus increases the safety factor when the piece of sports apparatus is used and improves precision when it is in need of maintenance.

This object of the invention is achieved in that the measuring device is designed for determination of the position of the coupling device and/or the coupling elements of the coupling device relative to one another and/or relative to the ski or the boot. It is advantageous, for determination of the position of the coupling device and/or the coupling elements of the coupling device which are relative to one another and/or relative to the ski or the boot, to check the appropriate, proper operating position of the coupling device on the piece of sports apparatus or on the boot in the coupling device and/or on the piece of sports apparatus and to indicate it to the user, so that misuse, in particular with coupling devices that can be adjusted by the user, can be prevented, and injuries resulting from faulty release avoided. At the same time the attention of the user is drawn to the position of the coupling device on the piece of sports apparatus so as to inform the user whether or not this position corresponds to the desired operating state or outside conditions when the piece of sports apparatus is in use. Thereby it is avoided, for example with an adjustment of the coupling device on the piece of sports apparatus, in particular a ski for powder snow, that people ski on an icy, hard ski-run, a fact which also gives more safety to the user of the piece of sports apparatus. Furthermore, it is advantageous that when arranging such a monitoring and/or controlling device, it can also be used by the service man during the mounting of the coupling device and/or during maintenance, which reduces the time needed for maintenance or improves the precision when adjusting the coupling device for different cases of application.

An embodiment, wherein the coupling device is positioned in a displaceable manner along a guideway that is stationary mounted on the piece of sports apparatus, and can be fixed by a fixing device in varying positions along this guideway and that the measuring device consists of a switching device activated by a stopping element of the fixing device which is associated with the individual stopping positions, is also advantageous, as provision is made not only for determining the position of the coupling device on the piece of sports apparatus, but simultaneously also for checking and ensuring proper locking after it has been adjusted.

Another development wherein one of the contact elements of the measuring device and/or a monitoring and/or controlling device is arranged in the piece of sports apparatus, in particular under a cover ply of the ski and another contact element being formed by the stopping element is arranged on the coupling device which is adjustable along the guideway or at least on the toe and/or heel clamp or a connection element achieves, also for the operation of a piece of sports apparatus under rough conditions, as is the case with a ski, an environmentally sealed embodiment of the measuring device or the monitoring and/or controlling device, of which the time spent on maintenance is reduced and a high life span of the monitoring and/or controlling device achieved.

In a version of the embodiment wherein the measuring device or its measuring elements are attached to the inputs of a position measuring and checking device, provision is made for the measuring devices or measuring elements to establish simultaneously a distance, so that not only the position of the coupling device on the piece of sports apparatus altogether, but also the distance between the individual parts of this coupling device can be easily established.

A further embodiment wherein the coupling device comprises two coupling elements, which, in the longitudinal direction of the ski are spaced from one another, and each of the coupling elements is connected with the piece of sports apparatus by fastening means, and wherein a fastening means or a contact connected with the coupling element is in contact with a measuring element, for example a resistance path or a light conducting path arranged inside the piece of sports apparatus, and wherein the fastening means of the coupling elements, which, in the longitudinal direction are spaced from one another, or the resistance path are attached to diametrically opposed inputs of the monitoring and/or controlling device, is advantageous in that the advantages in accordance with the invention can be made use of, regardless of whether or not the individual coupling elements of the coupling device, being at a fixed distance from one another can be adjusted, at least in one guideway, along the ski or whether or not the individual coupling elements, independent from one another, are fastened on the ski by special fastening means. Since the contact can also be made by fastening means, the adaptation of adjustment values of the coupling device to the distance between the coupling elements of a coupling device is also possible with coupling elements which are screwed onto the piece of sports apparatus.

A further embodiment wherein an output of an evaluation device of the position measuring and checking device lies at an input of a detection device to which, by means of a further input, a path and/or force measuring device is attached for the release force which can be preselected at the coupling elements, and which comprises an output, which changes on the display device the set and/or the release force to be set according to a distance between the two coupling elements in the longitudinal direction of the piece of sports apparatus or the boot length, allows the user not only a simple control of the adjusted values of the release mechanism which serves as a safety device, in particular for a release ski binding, but, at the same time it also improves considerably the safety already at the time the release force is adjusted during mounting, because the varying release forces resulting from different boot sizes and the release forces for adjustment can already be included.

In another development the increase in distance between the two coupling elements, starting from a desired nominal release force at a preselected standard distance between the coupling elements decreases the release force and when the distance is shorter, increases the release force, and the modification of the length of the lever arm, which is due to the different ski boot sizes and the resulting torque acting on the boot or the foot of the user can be immediately taken into account by a corresponding change of the release forces which are to be adjusted. Moreover, for an adjustment of the release mechanism to different distances between the coupling elements of the coupling device and therefore to the different ski boot sizes, the resulting appropriate release forces can be immediately indicated. Thus, a rapid adaptation of the adjustment values to the various users or to the various running abilities of the user can be easily achieved.

By virtue of an embodiment wherein associated with the release mechanism in the coupling device or at least in one of the two coupling elements is a path and/or force measuring device, which establishes the distance or the prestress force of a prestress device between a housing part of the coupling element which is fixed on the ski to which the boot is attached and the coupling element of the coupling device located in a guideway and adjustable against the effect of the prestress device opposite of the housing part, it is possible that the retention force necessary for safe functioning, for example a release binding can be checked, indicated and adjusted at all times.

The embodiment wherein the path and/or force measuring device is connected to the input of the monitoring and/or controlling device and the respective adjustment value of the prestress device starting from the nominal release force at the standard distance is indicated on the display device, facilitates a precise adjustment of the holding or release forces independent of the size of the boot.

A development wherein each of the two coupling elements is associated with its own detection device and each of the prestress devices being arranged within these elements has its own path and/or force measuring device, allows for a utilization of the controlled adjustment of the prestress device for the release of the coupling device in different three-dimensional directions.

By virtue of a variant of the embodiment wherein the measuring device for the establishment of the distance between the two coupling elements is arranged between the two adjusting elements of a connection element, in particular between connection bands of the coupling device that are connected by a lengthwise adjusting device and flexible in a direction perpendicular to the surface of the piece of sports apparatus, the adjustment value, which has been adapted to the corresponding boot size, can be directly established.

However, a variant of an embodiment wherein the measuring device consists of guiding elements mounted on the piece of sports apparatus or on a part of the connection element and a measuring element connected to the coupling device or a further part of a connection element, as for example a resistance path and a sliding contact, respectively capacitor plates, coils or the like is also possible, whereby a continuous coverage of the change in the position of the coupling elements of the coupling device relative to the piece of sports apparatus can be established.

A development wherein the measuring element arranged on the ski consists of magnets that are spaced from one another and arranged behind each other in the longitudinal direction of the ski, and the measuring device arranged on the coupling device is formed by an induction sensor or a permanent magnet, enables a contactless establishment of the desired measured values.

An embodiment wherein a measuring device for the boot length consists of a memory connected to the boot or a code marking associated with an inquiry element arranged on the piece of sports apparatus or the coupling device is possible, whereby the boot comprises a distinct characteristic from which bits of information can be obtained, such as the length of a shoe for example, which can be transmitted to the coupling device or the monitoring and/or controlling device. By comparing this information with data saved in a data memory of the control unit, control functions can be released and therefore, it is possible for example to readjust automatically the distance corresponding to the boot size. Furthermore, by this characteristic an illegal utilization can also be prevented by interlock means of the locking mechanism of the coupling device when a boot with another characteristic is used.

Furthermore, an embodiment wherein the prestress device comprises a force memory, the pressure force of which can be changed by means of an adjusting device, whereby the adjusting device is motionally connected with a servo-motor arranged on the housing of the coupling element, which is provided with a control circuit which is connected with the output of the detection device for a signal corresponding to the level of the prestress force, is also advantageous, as it allows for an all-automatic adjustment and readjustment of the prestress force at all times or for example, only during the mounting and can therefore considerably increase the safety when such a coupling device is in use.

Another advantageous development wherein the display device is built-in or on a coupling element facing towards one of the leading ends of the boot, makes provision for good reading of the values appearing on the indicating device having, especially with a ski, a protected arrangement, not requiring any further components for the piece of sports apparatus when making use of the advantages in accordance with the invention.

However, a development wherein the display device and the monitoring and/or controlling device with the evaluation and/or detection device are built onto the piece of sports apparatus or into it, is also advantageous, since the advantages in accordance with the invention can also be used for coupling devices, which are principally not equipped with a monitoring and/or controlling device, but wherein by integration of the indicating device and the control unit into the piece of sports apparatus, in particular into the ski, these devices are protected from humidity as well as from impacts.

By virtue of the arrangement wherein the display device and/or the monitoring and/or controlling device are built into an intermediate plate located between the piece of sports apparatus and the coupling device or the boot, customary coupling devices or sporting goods can be used and the advantages in accordance with the invention can be easily integrated by arranging an intermediate plate, even with this type of components. In addition, by arranging an intermediate plate, the control unit or the indicating device and if required, the energy source can be adequately well accommodated according to individual requirements.

Another development wherein the monitoring and/or controlling device is connected with the measuring devices at least by one line channel integrated in the ski and/or the intermediate plate and lines arranged in this channel, provides for a protected accommodation of line connections between the individual measuring devices and the control unit or the monitoring and/or controlling device.

A further embodiment wherein the monitoring and/or controlling device is associated with an input device, which comprises a function key and at least one input key, by means of which the display device can be attached as desired to the output of the evaluation or the detection device, makes it possible to enter the necessary data for safety settings, respectively for the proper positioning of the coupling device on the piece of sports apparatus when it is mounted and also when the coupling device or the piece of sports apparatus is used.

Another development, wherein with pieces of sports apparati used in pairs, the monitoring and/or controlling devices are preferably interconnected by wireless transmission means and preferably tuned to one another, makes provision for an identical setting of pieces of sports apparati used in pairs, in order to achieve the same behavior with both parts.

Furthermore, an embodiment, wherein the measured values, established on the pieces of sports apparati that are used in pairs, with the help of the measuring devices are added up and compared in one or both monitoring and/or controlling devices and are preferably used to determine and/or monitor the release forces and/or the distance between the coupling elements, is also advantageous, since it is possible to take into account, for example the total weight of the user, which is divided up on the two pieces of sports apparatus being used in pairs.

An embodiment wherein a measuring device arranged between the boot and the ski is attached to the monitoring and/or controlling device in order to determine the weight of the user of a piece of sports apparatus, is also advantageous since a decisive factor for adequate safety setting of this type of coupling devices can be used automatically and without keying error in the monitoring and/or controlling device, so that the coupling device can be properly positioned and adjusted.

Furthermore, an embodiment wherein the coupling device or the ski is associated with a blocking device that is activated by a monitoring and/or controlling device and which comprises a blocking element tightening the coupling elements or the coupling device, which, when in an unlocked position, prevents that the boot is fixed in the coupling device, is also advantageous, as it prevents without any additional precautions illegal use or theft of the piece of sports apparatus just by further use of the monitoring and/or controlling device.

A development wherein a speed indicator is attached to the monitoring and/or controlling device, in particular formed by a dynamic pressure indicating unit, is also advantageous since the available energy source and control unit can also be used to indicate the speed.

A variant of the embodiment wherein a clock is arranged on the monitoring and/or controlling device or in the display device, which, if required, can be displaced by external keys, in particular a timer that is activated by external keys allows the user of the piece of sports apparatus to take the time, while this clock may be used simultaneously for the flow of control at the control unit or the monitoring and/or controlling device.

A development wherein a sensor, connected with the control unit, for temperature detection is arranged in the display device or the coupling device or the ski, allows temperature adaptation of the measured values which have been established or indicated by the control unit or by means of the monitoring and/or controlling device.

The additional embodiment wherein sensors for altitude measuring and/or a compass or a gyrostatic navigation system, in particular a clinometer, are connected to the monitoring and/or controlling device or the display device, makes it possible to use simultaneously the monitoring and/or controlling device for orientation or search of the ski-run even on almost impassable ground or poor visibility.

For safety of the user serves a further developed monitoring and/or controlling device with an integrated radio range beam, whereby the monitoring and/or controlling device is connected with a transmitting and receiving device or a detector for radio range beams, in particular to locate skis in deep snow or avalanche victims after avalanches have come down. Thanks to the reversible switching of the transmitter-receiver pair, the monitoring and/or controlling device can be used to search and also to find lost articles.

A cost-effective energy supply of the monitoring and/or controlling device is achieved by the embodiment wherein the energy source for the monitoring and/or controlling device is arranged in a receiving chamber of the ski and/or the intermediate plate and/or the coupling device.

A disposition of the energy source wherein the energy source for the monitoring and/or controlling device is arranged in the boot and connected by a preferably wireless transmission device with the monitoring and/or controlling device, is also advantageous, as provision is made for easy reloading of the energy source, in particular when the piece of sports apparatus and the coupling device is not in use. In addition, contact troubles during the energy supply of the monitoring and/or controlling device can be avoided by means of the wireless transmission device.

The development wherein the energy source is connected with the display device and/or the monitoring and/or controlling device by a detachable plug-in device or a wireless transmission device, creates an operationally reliable and cost-effective energy supply with simple loading possibilities, which, in addition, can be adapted to varying energy requirements.

A development wherein the energy source is arranged in a pole and this energy source can be connected to contact areas in the region of the leading end of the ski pole by using a switching device and the display device or the monitoring and/or controlling device is associated with a receiving opening with diametrically opposed contact areas, is also advantageous, since the energy supply of the monitoring and/or controlling device can only take place at a time when the values saved in the monitoring and/or controlling device are used or a reading takes place.

A development wherein the energy source consists of solar cells arranged on the surface of the ski or a solar cell arrangement forming the same, is also possible, whereby for example, the energy source, which is arranged in the coupling device and in the piece of sports apparatus can be continuously reloaded.

A variant of the embodiment wherein measuring devices to determine the position and/or the closing forces, are associated with the release mechanism of the coupling device at least in their driving position that fixes the boot to the piece of sports apparatus, and connected with the display device by means of the monitoring and/or controlling device, allows also advantageously for proper closing and locking of the coupling device after the boot has been inserted, and if applicable, for monitoring in a simple manner the build-up of retention and release forces.

Furthermore, an embodiment wherein the output of the measuring device for the actual value of the position and/or the closing forces can be compared to a comparator with a nominal value that can be predetermined by means of an adjusting device, on the display device or which is indicated by a different signal by means of a warning device when the actual value and the nominal value are not matching for the display, is also possible, whereby proper or improper operation of the coupling device is indicated to the user, both, in a visual as well as in an acoustic manner.

By virtue of an embodiment wherein the monitoring and/or controlling device can be activated by a movement sensor or a measuring device which establishes the weight, or an external switch, energy requirements for the monitoring and/or controlling device can be reduced.

An effective reduction of the energy requirement for the monitoring and/or controlling device can also be achieved by an embodiment wherein when the coupling device is activated, the energy source is connected to the monitoring and/or controlling device and a time retarding element is started, which after a preselectable period of time interrupts the energy supply for the monitoring and/or controlling device.

A troublefree operation of the line connections between the individual measuring devices of the control unit and the indicating device can also be achieved by a development wherein the lines or conducting paths for the connection of the individual components of the monitoring and/or controlling device are arranged in the piece of sports apparatus, in particular in the form of a plate or conductive plastic material layer and which are connected by means of contact devices to the measuring devices of the monitoring and/or controlling device.

Finally, the various embodiments wherein the measuring device is formed by a capacitive and/or inductive and/or ohmic and/or visual transmitter, which can be developed as a face plate transmitter and/or shaft encoder and/or contact maker and/or sound transmitter, allow for an optimum adaptation of the measuring devices to the different operating conditions or respectively the mounting in case of different coupling devices.

BRIEF DESCRIPTION OF THE DRAWINGS

For a better understanding, the invention will now be described hereinafter, by way of example only, with reference to the accompanying drawings, in which:

FIG. 11 is a top view of another embodiments of a monitoring and/or controlling device on a coupling device;

FIG. 12 is a front view of the monitoring and/or controlling device, in a section taken along the lines XII—XII in FIG. 11;

DETAILED DESCRIPTION OF PREFERRED EMBODIMENTS

Figure 1:
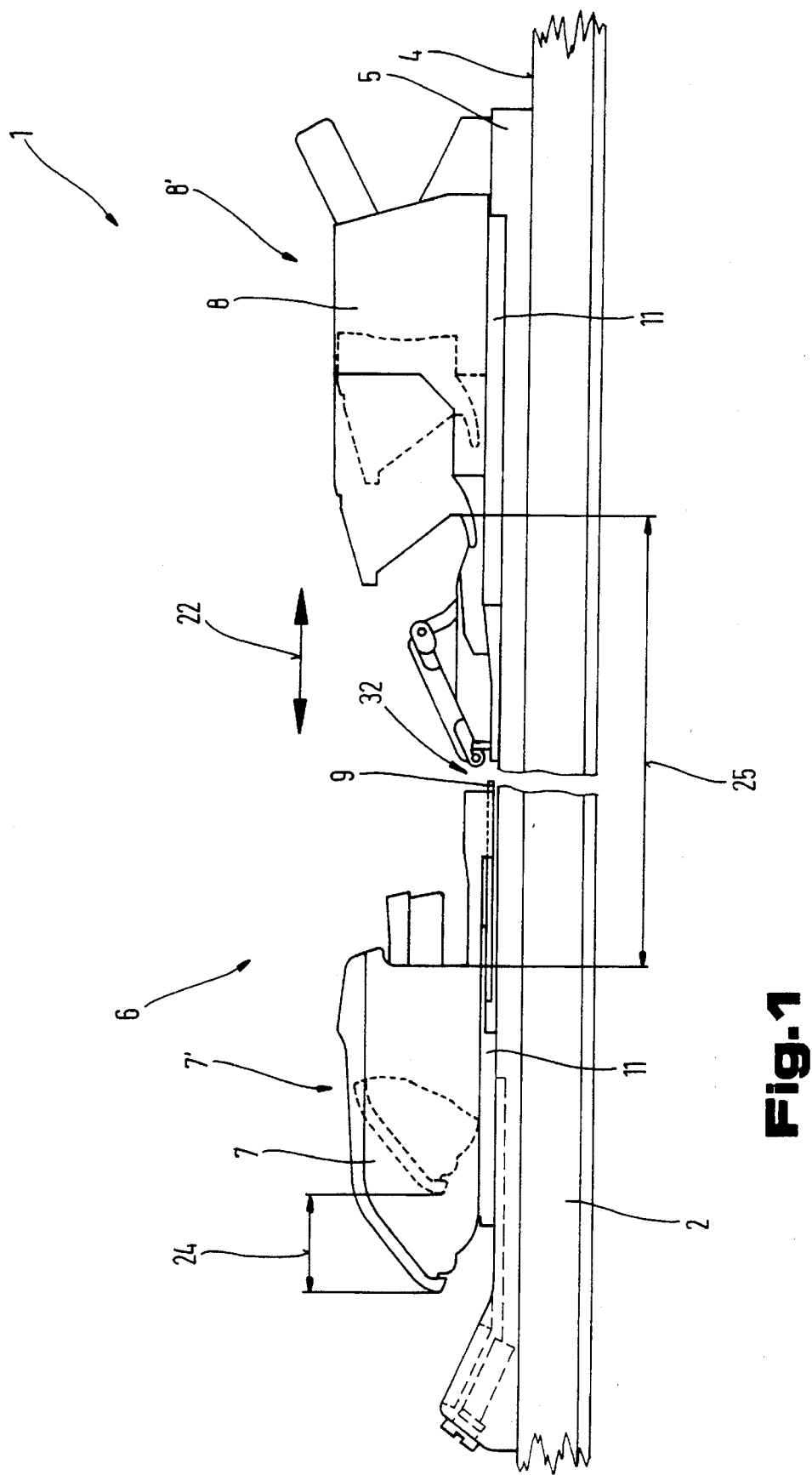
FIG. 1 is a simplified, schematic illustration of a monitoring and/or controlling device with a coupling device in accordance with the invention.
Figure 2:
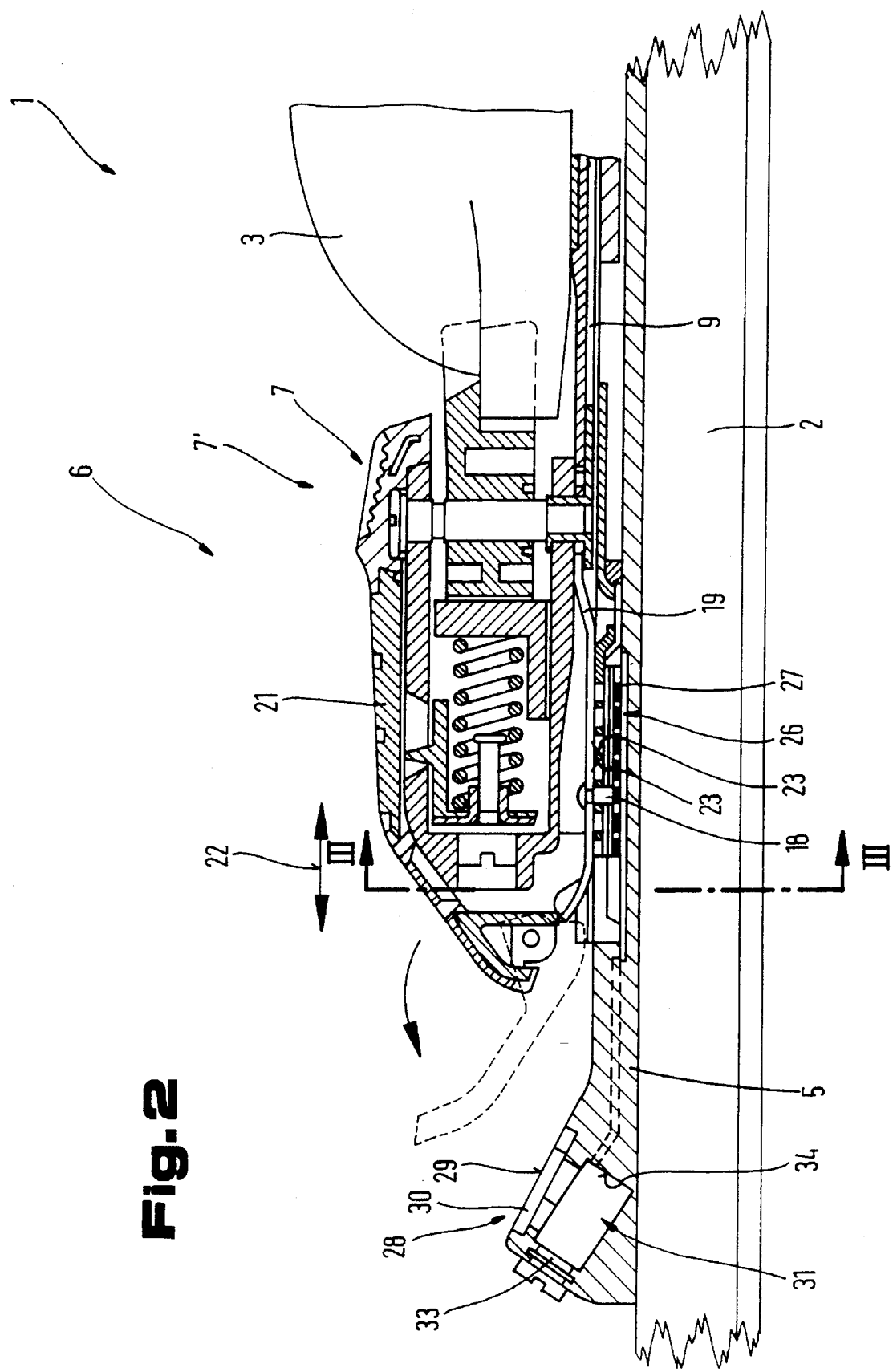
FIG. 2 is a side view of a portion of the coupling device with the monitoring and/or controlling device, in a section taken along the lines II—II in FIG. 3.
Figure 3:
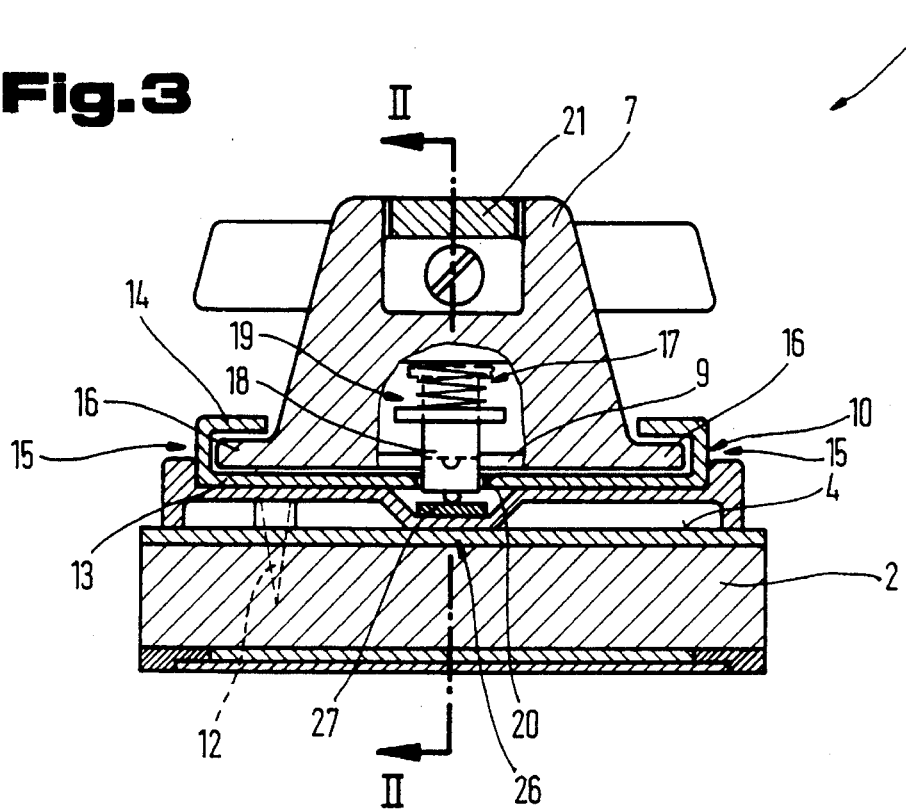
FIG. 3 is a front view of the coupling device with the monitoring and/or controlling device, in a section taken along the lines III—III in FIG. 2.

FIG. 1 to 5 show a piece of sports apparatus 1, in particular a ski 2. In order to connect a boot 3 with the ski 2, on a surface 4 of the ski 2 by means of an intermediate plate 5 a coupling device 6 is attached. The latter consists of a toe clamp 7 and a heel clamp 8, which form the coupling elements 7 and 8 and are connected to one another for common movement via a band-shaped connecting element 9 extending in the longitudinal direction of the ski 2.

To allow for an adjustment of the coupling device 6 in the longitudinal direction of the ski 2, guiding elements 11, formed by approximately C-shaped profiles 10, are arranged in the region of the toe clamp 7 and the heel clamp 8 on the intermediate plate 5, which are secured in a fixed manner to the ski 2 with fastening screws 12 and in which the toe clamps 7 and the heel clamps 8 are lengthwise movably positioned. A web 13 and shanks 14 of the C-shaped profile 10 which run substantially parallel to the web and extend towards each other, form a guideway 15, in which guide extensions 16 of the coupling device 6, i.e. or the toe clamp 7 and the heel clamp 8, are guided.

For the fixation of the coupling device 6 in a desired, predetermined position in the longitudinal direction of the ski 2, the toe clamp 7 comprises a fixing device 17. This fixing device comprises for example a bolt shaped stopping element 18, extending towards ski surface 4 which, under the effect of a spring element 19, for example a leaf spring, a flat spiral spring, etc., is biased in the direction of the surface 4 of the ski 2 and is held securely in openings 20 of the web 13 of the profile 10. A lever element 21 pivotally positioned on the toe clamp 7 can be pivoted in order to adjust the coupling device 6 and the stopping element 18 can be pulled out of the opening 20 in opposition of the effect of the spring force exerted by the spring element 19, which is shown in broken lines, and thus, the fixing device 17 can be released. This makes it possible that the coupling device 6 can be adjusted along a displacement path in the longitudinal direction of the ski, as shown by arrow 22, and the stopping element 18 may be positioned in further openings 23 arranged in the vicinity of the opening 20 along the displacement path. Thanks to the given number of openings 20, 23 the coupling device 6 can be displaced and positioned in an adjusting area 24 in a location close to or remote from the leading end of the ski while an unchanged distance 25 between the toe clamp 7 and the heel clamp 8 can be maintained through the connecting element 9.

It is, of course, possible that the fixing device 17 together with the stopping element 18 is arranged exclusively or additionally to the toe clamp 7 also in the heel clamp 8 and that the openings 20, 23 are arranged in the guiding element 11 of the heel clamp 8. Moreover, it is possible that the openings 20, 23 are arranged either exclusively or additionally in the toe clamp 7 or the heel clamp 8 and that the fixing device 17 together with the stopping element 18 is arranged on the intermediate plate 5 or the ski 2.

To monitor this adjustment process and in particular to determine or indicate the position of the coupling device 6 in relation to the longitudinal extension of the ski 2, a measuring device 26 is arranged on the side of the guideway 15 facing away from the stopping element 18 of the fixing device 17. This measuring device 26 may consist of a switch 27, the contact of which is open at its relaxed neutral position and closed when the stopping element 18 is in a fixing position.

If a switch 27, associated with a respective one of the openings 20, 23 that are arranged successively in the direction of the guideway 15, is activated by the stopping element 18, it shows to the user that the coupling device 6 is properly fixed on the ski 2. Depending on which of the switches 27 has been activated by the stopping element 18, it can be determined in which position in relation to the longitudinal direction of the ski 2, the toe clamp 7 and therefore the coupling device 6 is stopped. This way, the user is informed in a simple manner, graphically or by virtue of a reference number, about the position of the coupling device 6 and its precise lock position by a display device 28.

Display device 28 may be arranged in the intermediate plate 5 and comprises an appropriate display field 29, for example an LCD display 30. Depending on the selected position of the coupling device 6 on the ski 2, a number establishing this position and/or a text associated with this position, and/or an audio signal and/or a verbal or graphic information can now be given by this display. However, it is also possible, that this display device 28 together with its switches 27 is integrated in a monitoring and/or controlling device 31, which enables by wireless transmission means an exchange of information between the established position values of coupling devices 6 arranged on sporting goods which are used in pairs. When the two adjustment values are not matching, it is possible to indicate this, acoustically or visually, to the user or to point out to him that the skis must not be used since different positions have been set for the two pieces of sports apparatus 1 which have to be used at the same time. Thus, accidents can be avoided for the next user of such a piece of sports apparatus 1 thanks to the different reaction of the two pieces of sports apparatus 1. For simple monitoring of the different settings on the bindings, in particular with sporting goods that are used in pairs, it is also advantageous if the monitoring or the transmission of the adjustment values occurs in a sort of remote-controlled operator device which is separate from the piece of sports apparatus. This has the advantage that the work of the components, in particular of the display elements and the energy supply can take place in a considerably easier way since these components are not directly exposed to atmospheric influences.

Of course, it is also possible that the measuring device 26 instead of a switch 27, for example of a micro-switch consists of an induction switch, an eddy current switch or any other optional contact, for example a light barrier or a proximity switch. Furthermore, the measuring device 26 may also be a capacitive, inductive or ohmic transmitter. The measuring device can also be a face platetransmitter, shaft encoder or contact maker. Moreover, in order to establish the adjusting process any optional light barrier arrangement can be used, for example with transmitting and receiving elements arranged at equal or different distances from one another along the adjusting stretch. For this, the adjustable part of the binding can be provided with a control shield which interrupts in any desired stopping position the light barrier arrangement associated therewith. The guiding of the relatively movable parts towards one another or the positioning of the screening elements and that sort of thing can take place by magnetic forces. In order to monitor the position of the binding relative to the ski and for all other measuring processes, the above mentioned measuring devices, and also the sound transmitters and those which pick up changes in the measured value by modifying an electric or magnetic field, can of course also be used.

As shown, if the toe clamp 7 is connected together with the heel clamp 8 by means of the connecting element 9 to form an adjustment coupling device 6, then the adjustment of the toe clamp 7 or the heel clamp 8 establishes the position of the whole binding on the ski 2.

This explains why in the present invention it is not important whether or not the fixing device 17 is arranged in the region of the toe clamp 7 or the region the heel clamp 8 or in the region of the connecting element 9. Depending on whether a measuring device 26 is associated only with the toe clamp 7 and/or the heel clamp 8 and/or the connecting element 9 to establish their position relative to the piece of sports apparatus 1, the position of the coupling device 6 and/or the distance 25 between the toe clamp 7 and the heel clamp 8 in the longitudinal direction of the ski can be established and monitored in case the connecting element 9 comprises a lengthwise adjusting device 32, which will be described in detail in the following figures, to adapt the distance 25 to different boot sizes.

To supply this monitoring and/or controlling device 31 with energy, an energy source 33, which is effectively connected to the monitoring and/or controlling device 31 by wired or wireless transmission means, is arranged in the intermediate plate 5 or in the piece of sports apparatus 1, in particular the ski 2 or in the boot 3 which is attached on the piece of sports apparatus by the coupling device 6.

Due to the circuit connection of a circuit board 35 arranged in a receiving chamber 34 of the intermediate plate 5, with the energy source 33, with the LCD display 30 and switches 27 which are activated by the stopping element 18, a position measuring and checking device 36 is achieved, which allows the user to check if the fixing device 17 works properly and to read the set position of the coupling device 6 on the piece of sports apparatus 1 before he uses the piece of sports apparatus 1, in order to draw conclusions about the behavior of the piece of sports apparatus 1 when in use and thus to be able to adapt his running behavior accordingly.

Figure 4:
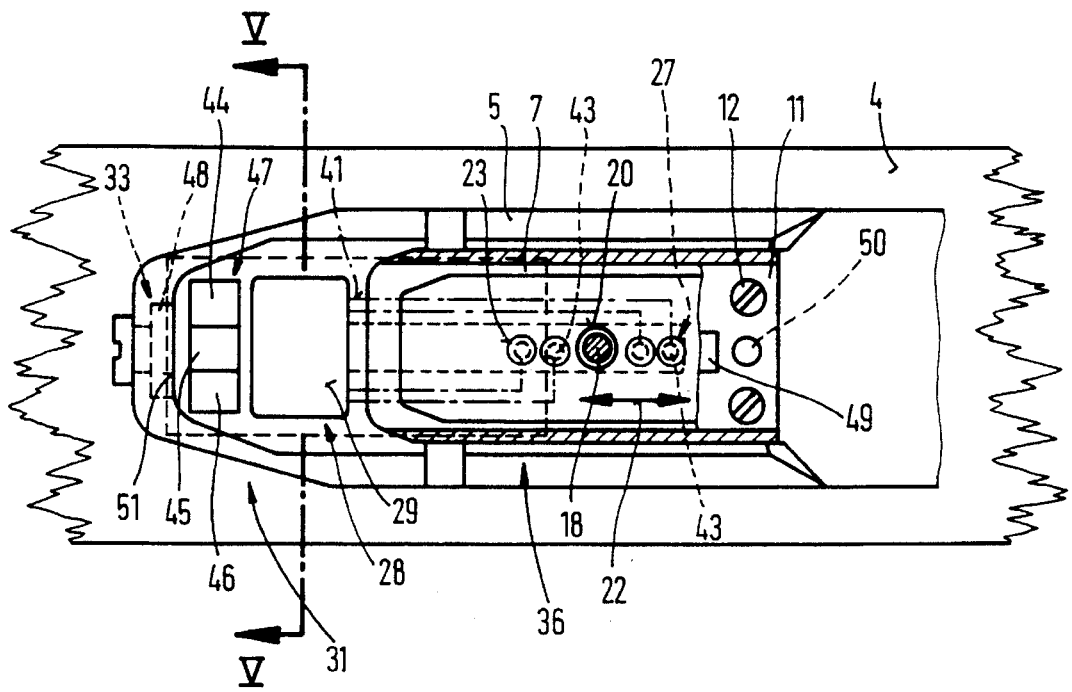
FIG. 4 is a top view, partially in section, of a portion of the monitoring and/or controlling device in accordance with the invention in the region of the coupling device.
Figure 5:
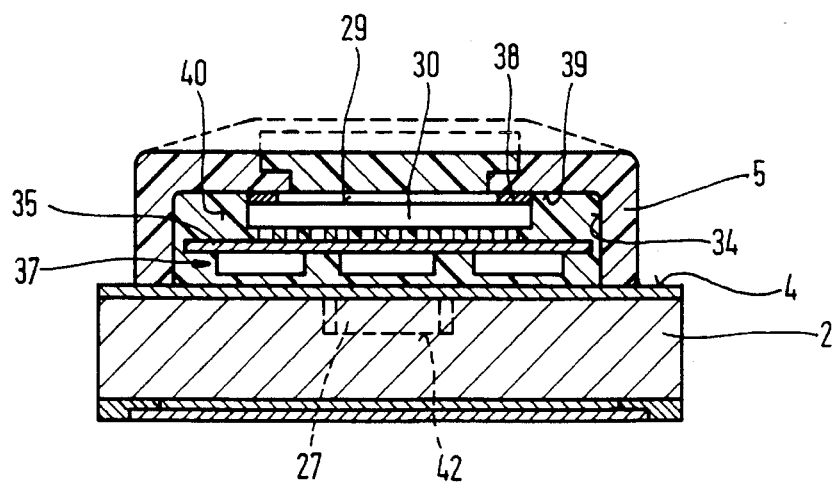
FIG. 5 is a front view of the monitoring and/or controlling device, in a section taken along the lines V—V in FIG. 4.

As can be seen from FIG. 4 and 5, the intermediate plate 5 is shown in the region of the toe clamp 7 with the display device 28 and the monitoring and/or controlling device 31 which is built in in the intermediate plate 5. The intermediate plate 5 comprises a receiving chamber 34 for a circuit board 35 facing towards the surface 4 of the ski 2, in which, preferably facing towards the ski 2, electronic components 37 are arranged as for example transistors, resistors, IC-elements, calculating elements, RAM and ROM memories, etc. On its side preferably facing away from the electronic components 37, an LCD display 30 is arranged facing towards the display field 29. In the region of the LCD display 30, the intermediate layer 5 comprises a receiving chamber 34 which is sealed off by a transparent material such as PVC, quartz glass, etc. The arrangement of a sealing element 38 between the LCD display 30 and an inner wall 39 of the receiving chamber 34 is also advantageous since it provides protection against entering humidity. However, the sealing element 38 can also be arranged between the transparent material and the receiving chamber 34. Furthermore, an appropriate finish is achieved by filing the remaining hollow space of the receiving chamber 34 with a sealing compound 40 which provides electrical screening and insulation against humidity serving as humidity protection for the electronic components 37 or the LCD display, etc. From the circuit board 35 lines 41 are leading to the switches 27, which are arranged on the surface 4 of the ski 2 or as shown in broken lines, in depressions 42 of the ski 2 and which comprise concentrically to the openings 20, 23 contact elements 43.

As further illustrated, the monitoring and/or controlling device 31, is for example an input device 47 with input keys 44, function keys 45, return keys 46, which is associated with an energy source 33 in the form of a battery 48.

If the toe clamp 7 is now positioned by means of the stopping element 18 engaging in one of the openings 20, 23 along a displacement path according to the double arrow 22, the stopping element 18 activates the contact element 43 of one of the switches 27. Thus, the control circuit is closed and the user informed by signals through an appropriate display on the display field 29 on the one hand, about the perfect stopping and on the other hand about the position of the toe clamp in relation to a defined zero position prepared by the monitoring and/or controlling device 31 in numerical order, for example showing +1, +2, −1 and −2, respectively graphically, by symbols, curves, etc. In order to reduce the energy requirement of the monitoring and/or controlling device 31, with the energy intensive LCD display 30 to a minimum, it is, for example possible to arrange a contact element 49 in the region of the toe clamp 7 where the boot 3 contacts the toe clamp 7, which works together with a time-controlled circuit breaker of the monitoring and/or controlling device 31, which causes the LCD display 30 to indicate the respective bits of information only over a short, predeterminable period of time after the boot 3 has been fixed in the coupling device 6 and after the chosen period of time has expired, to interrupt the energy supply automatically.

Instead of the contact element 49 a light sensor 50 can be arranged at a suitable place on the toe clamp 7 and connected by a line with the monitoring and/or controlling device 31 or a circuit breaker for the energy supply. Instead of the contact element 49 or the light sensor 50 there may also be a sensor of motion, which, when motions are detectable, particularly when the ski is being used, activates the display, indicating the measuring values or after a certain period of rest, stops the energy supply. As shown in FIG. 5 by broken lines, the intermediate plate 5, in its end portion 51 holding the display device 28 can be formed in an inclined manner relative to the surface 4 of the ski 2 in the direction of the user, which provides for better reading of the information indicated in the display field 29.

It is, however, also possible, that the display device 28 is arranged or built in on the surface or the upper side of the toe damp 7. Therefore, it is possible to have the monitoring and/or controlling device built in directly when the binding is produced and sold together.

To transmit the measuring values between the toe clamp 7 and the heel clamp 8 or between the monitoring and/or controlling device and the individual measuring devices, it is of course possible to use light guides, preferably from plastic material.

Figure 6:
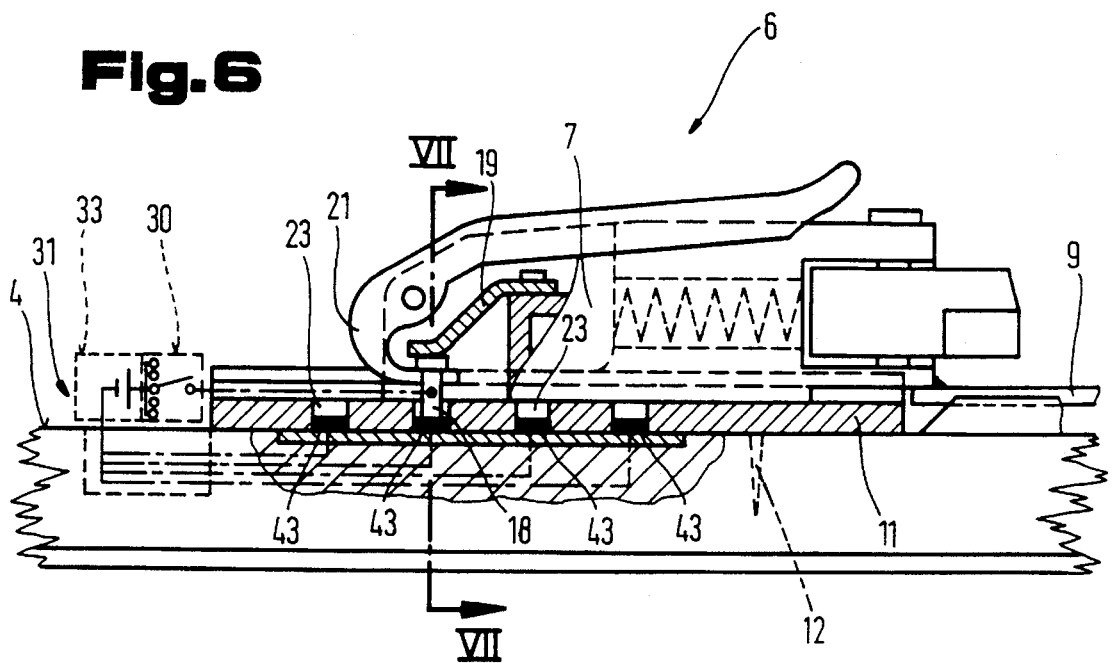
FIG. 6 is a side view and a simplified, schematic illustration, partially in section, of another embodiment of a monitoring and/or controlling device with a coupling device in accordance with the invention.
Figure 7:
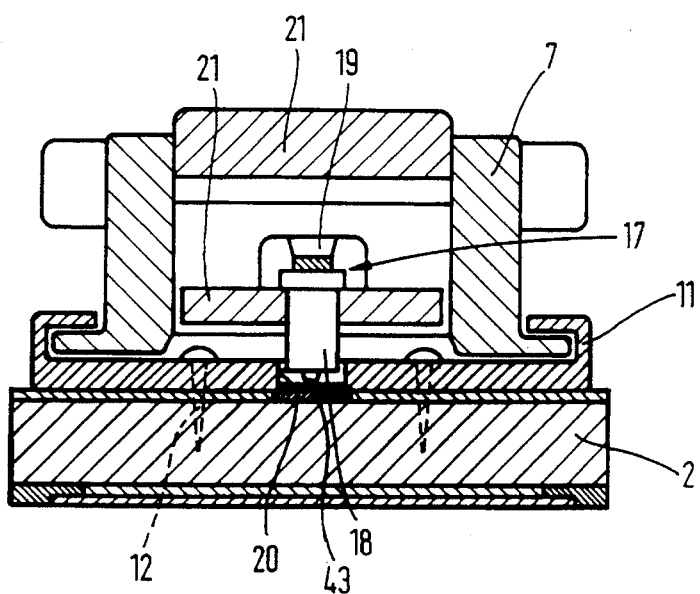
FIG. 7 is a front view of the coupling, in a section taken along the lines VII—VII in FIG. 6.

FIG. 6 and 7 show a portion of the coupling device 6 with the toe clamp 7 and the monitoring and/or controlling device 31. With this embodiment the guiding element 11 for the toe clamp 7 is fastened directly on the surface 4 of the ski 2 by means of fastening screws 12. The toe clamp 7 comprises the fixing device 17, which is equipped with the stopping element 18 spring-loaded by the spring element 19 in direction of the surface 4 and which engages in the opening 20 when in stopping position and fixes the toe clamp relative to the guiding element 11 and therefore to the ski 2.

With the help of the lever element 21 it is now possible to pull out the stopping element 18 from the opening 20, opposing the effect of the springs of the spring element 19, in order to displace the toe clamp 7 in the longitudinal direction of the ski and to position or stop it in one of the openings 23 in the vicinity of the opening 20. Immersed in the surface 4, the openings 20, 23 are associated with the contact elements 43, which are activated when the toe clamp 7 is positioned and fixed by the stopping element 18, which closes each time the control circuit being supplied by the energy source 33 and indicates in the display field 29 or on the LCD display 30 by a light element associated with each control circuit, the appropriate position taken as well as proper stopping.

Figure 8:
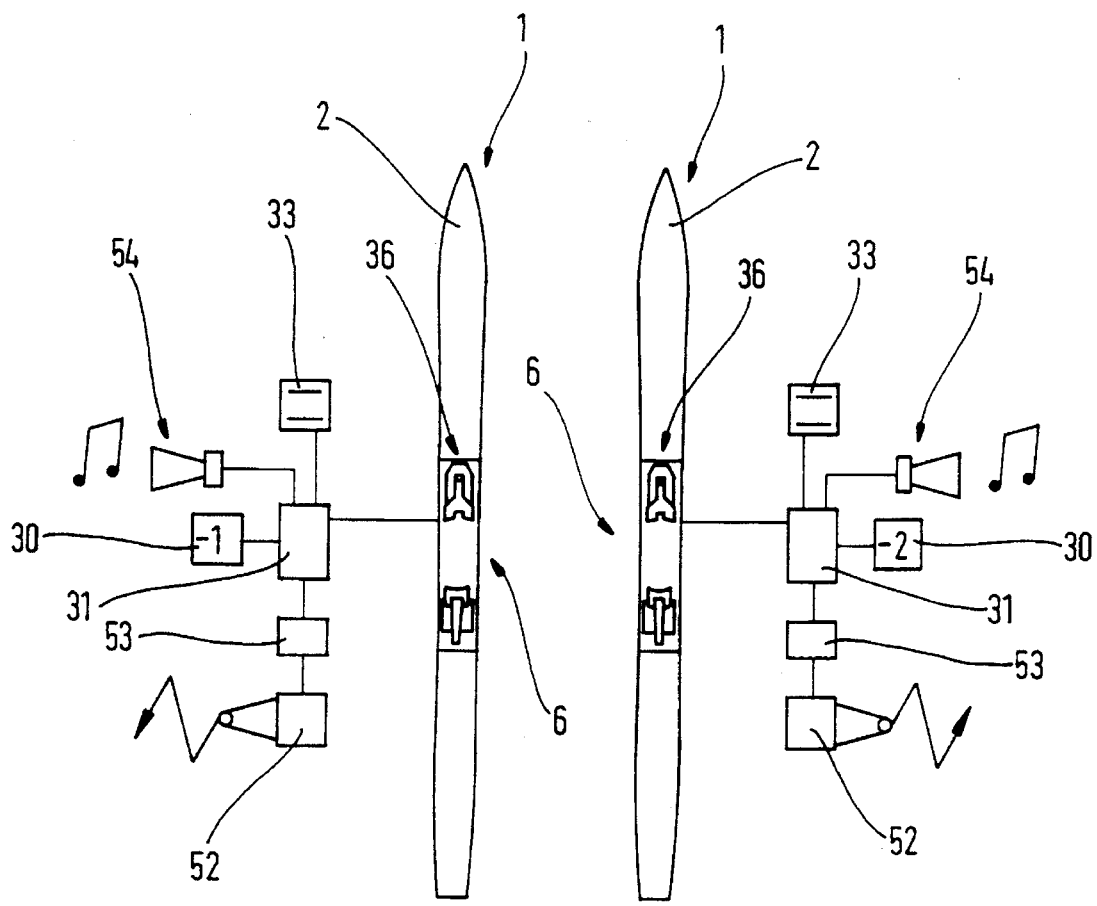
FIG. 8 is a circuit diagram of a monitoring and/or controlling device in accordance with the invention for a piece of sports apparatus to be used in pairs.

FIG. 8 shows schematically the combined effect of the monitoring and/or controlling devices 31, which are each time associated with pieces of sports apparatus 1 that are used in pairs. Each piece of sports apparatus 1, for example the ski 2 comprises a coupling device 6 which operates together with the monitoring and/or controlling device 31. This includes in addition to the fixing device of the coupling device 6, the measuring device, the circuit board with the LCD display 30 and the energy source 33, a wireless operating transmitting and receiving device 52 and a comparing element 53.

Therefore, if different values are established when the piece of sports apparatus 1 is being used, for example after the boots 3 have been fastened in the coupling devices 6, based on position information in the comparing elements 53 exchanged between the transmitting and receiving devices 52, this can be indicated by an acoustic or visual warning device 54, which is activated by the monitoring and/or controlling device 31, for example a horn, a loudspeaker, a flashing indicator in addition to the numerical display on the LCD display 30.

This provides an advantageous contribution to increased safety, since the user cannot use the pieces of sports apparatus 1 with coupling devices 6 in different positions, a fact which increases the safety for the user.

Figure 10:
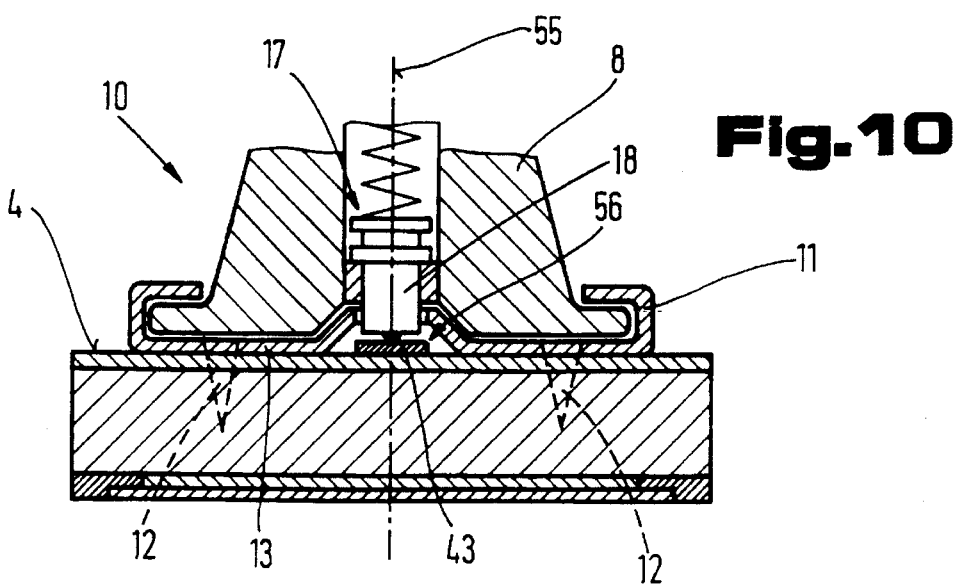
FIG. 10 is a front view of the coupling device with the monitoring and/or controlling device in accordance with the invention, in a section taken along the lines X—X in FIG. 9.
Figure 9:
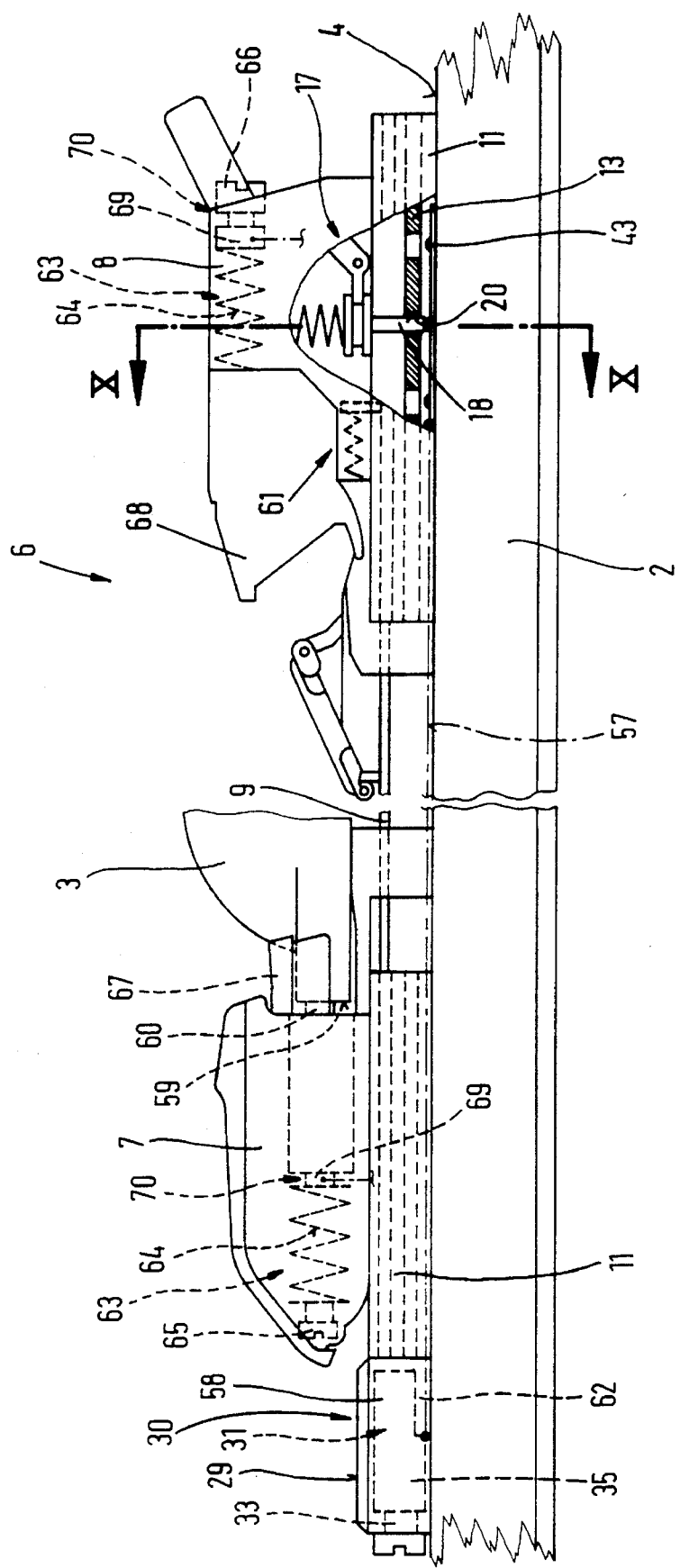
FIG. 9 is a simplified, schematic illustration of a further embodiment of a coupling device with a monitoring and/or controlling device in accordance with the invention.

FIG. 9 and 10 show another embodiment of the arrangement wherein the monitoring and/or coupling device 31 is equipped with the coupling device 6. Here, the guiding elements 11 of the toe clamp 7 and the heel damp 8 are preferably arranged directly on the surface 4 of the ski 2 and affixed to ski 2 by means of fastening screws 12. However, in this case an arrangement of an intermediate plate is also possible. In or on this plate the toe clamp 7 and the heel damp 8, which are connected by the connecting element 9, are located in a lengthwise displaceable manner. In order to establish a position of the coupling device 6, the heel clamp 8 comprises the fixing device 17 with the stopping device 18, which, being spring-loaded, engages in the openings 20, that are provided in the profile 10 forming the guiding element 11 in the web 13. The web 13 of the guiding elements 11 comprises transverse to its longitudinal extension about symmetrically to a symmetrical axis 55, a U-shaped depression, which creates between the surface 4 of the ski 2 and the web 13 a hollow space 56 for the contact elements 43 which are arranged on the surface 4 or and for connecting circuits 57 passing through the hollow space 56. The connecting circuits 57 lead from the contact elements 43 to a housing 58 for example which is arranged in the region between the toe clamp 7 and the front end of the ski on the surface 4, and which receives the circuit board 35 of the monitoring and/or controlling device 31 with the LCD display and if applicable, the energy source 33 protecting them against humidity and impacts.

Furthermore, in this embodiment, a front edge 59 of the boot 3 is associated with a measuring device 60 arranged in the toe clamp 7, for example a force sensor, by means of which the tension force exerted on the boot 3 by the adjustable prestress device 61 located in the coupling device 6 or provided in the heel clamp 8, is measured. The measuring signal of the measuring device 60 is changed by an evaluation panel 62 arranged on the circuit board 35 into an indicating signal, for example in the form of a numerical or graphical display and is made visible in the indicating field 29.

As can be seen further in FIG. 9, the toe clamp 7 and the heel clamp 8 have release mechanisms 63 which consist of pressure springs 64, the spring force of which has to be overcome when the boot 3 is released in case of overstressing due to a fall. In such a case, when the release value preset by the adjusting screws 65, 66 has been exceeded, a sideward movement of a holding down device 67 of the toe clamp 7 or an upward movement of the holding down device 68 of heel clamp 8 is achieved, and the boot 3 is suddenly released before damaging forces can affect the feet of the user. In the region of the pressure springs 64 or between those springs and the adjusting screws 65, 66 or the holding down devices 67, 68 measuring devices 70 acting as force-sensing devices 69 by which the set release force can be measured and transmitted by lines to the monitoring and/or controlling devices 31 and which can be indicated in the same way as the position values by a numerical indication in the display field 29.

In general, according to the DIN norm 7881, these release values are described as so-called Z-values, said Z-values being established when individual pieces of information are taken into account, which can be established when the coupling device 6 is adjusted by the user and which, can be determined by taking into account for example, his running ability, body weight, shinebone head diameter and/or age.

Thus, it is now also possible, in addition to the indication of the position taken by the coupling device 6 on the ski 2, to indicate visibly and to monitor by the user the decisive tension force for proper adjustment for the functioning of the safety release.

FIG. 11 and 12 show a further embodiment of the monitoring and/or controlling device 31, the position measuring and checking device 36 of which is associated with the toe clamp 7. In order to change the distance 25 between the toe and the heel clamp 7, 8, the connecting element 9 is formed in a divided manner between the toe clamp 7 and the heel clamp 8, in which an adjusting element 71 which is fixed on the toe clamp 7 is tensionally connected by means of a tooth arrangement 72 with an adjusting element 73 connected to the heel clamp 8, all of which constitute the lengthwise adjusting device 32. In order to fix the relative position of the adjusting elements 71, 73 to one another they can be fixed by holding elements 74, 75 which form a screwed connection with one another. After separation of the screwed connection the adjusting elements 71, 73 in the longitudinal direction of the ski can be adjusted relative to one another by a distance 76 corresponding to a tooth division or a measure corresponding to a multiple of the distance 76, which makes it possible to adjust the distance 25 to varying boot sizes.

To establish the relative position of the adjusting elements 71, 73 to one another, one of the adjusting elements 71, 73, for example the adjusting element 71 comprises for example a measuring device 78 formed by a resistance path 77 along which a sliding contact 79 is connected with adjusting element 73 for displacement therewith. The lines 80, 81 connect the measuring device 78 and the sliding contact 79 with the circuit board 35 arranged in the housing 58 and via the circuit board with the energy source, which, as shown for example, consists of a solar cell arrangement 82.

This way, the position of the coupling device 6 on the piece of sports apparatus 1 or the set distance 25 between the toe clamp 7 and the heel clamp 8 can be indicated through the display field 29, for example by a separate call using optionally the function key 45 and/or the input key 44. This enables the user to make a visual control of the adjusting values and to correct any faulty adjustments before the piece of sports apparatus 1 is used.

Figure 13:
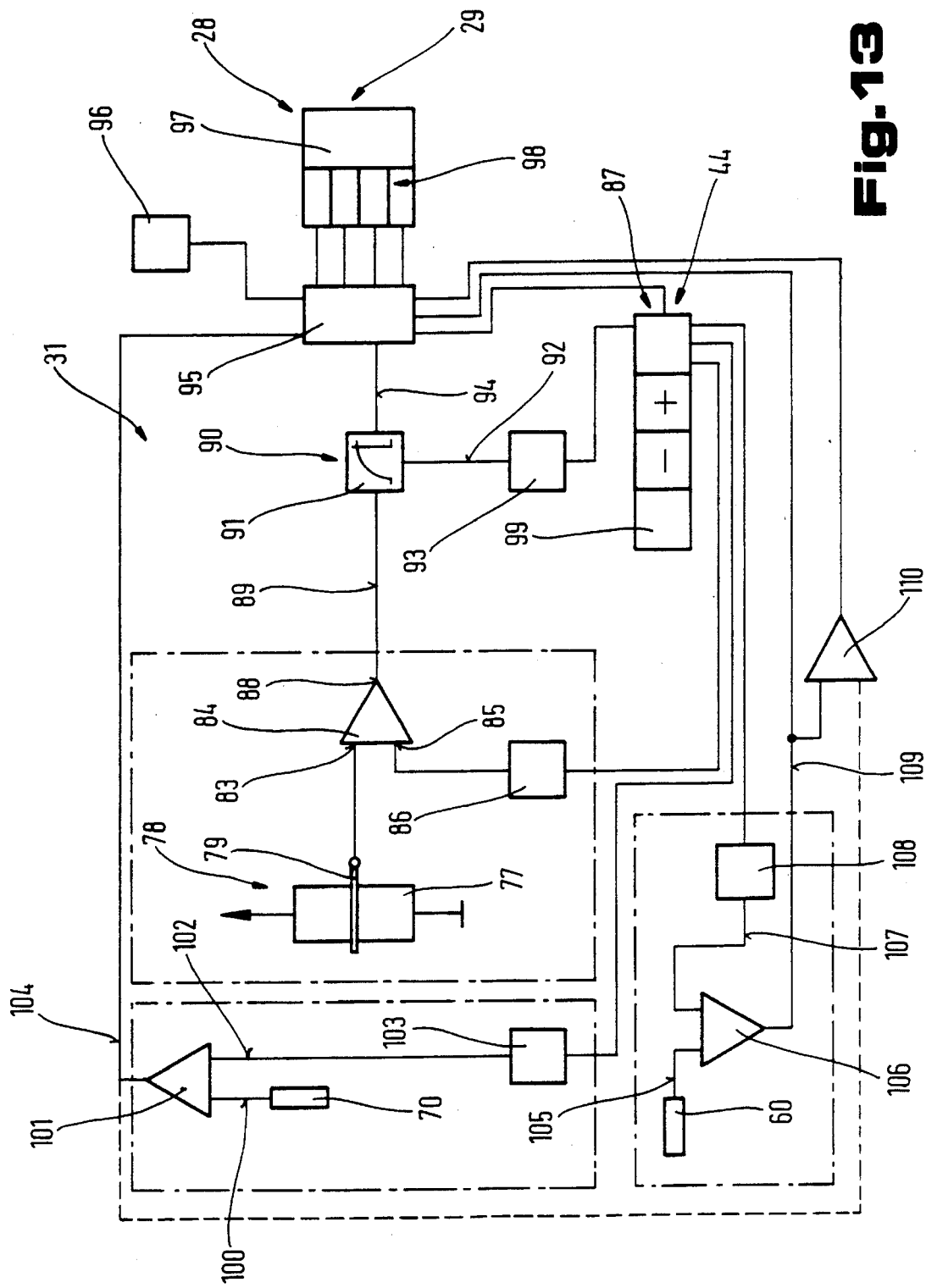
FIG. 13 is a simplified, schematic illustration of a circuit diagram of the monitoring and/or controlling device in accordance with the invention according to FIG. 11 and FIG. 12.

FIG. 13 shows a circuit diagram of a possible embodiment of a monitoring and/or controlling device 31 for the embodiment according to FIG. 11 and 12.

As can be seen from FIG. 11 and 12, the toe clamp 7 and the heel clamp 8 of the coupling device 6 is adjustable by the lengthwise adjusting device 32 for different distances 25, so that the coupling device 6 can be easily adjusted to different boot sizes. As can be deduced from the above information, when the binding is adjusted, a reference number defined as a Z-number, which can be calculated from the running ability and/or the weight and/or the age and/or the gender and/or the shinbone head diameter of the user, has to be taken into account. This Z-number applies to a certain boot size and sole length, for example the Z-number is adapted to a sole length of 327 mm according to the definition.

Due to the lever ratios for the release of the safety devices in the coupling device 6, these Z-numbers have to be adapted to changing sole lengths. With a sole length that is longer than 327 mm, the Z-number is to be reduced in comparison to the sole length of 327 mm used to calculate and to establish the Z-number, whereas with a shorter sole length, the Z-number is to be increased. In order to monitor the adjusting processes or to carry them out in an easier manner, the adjusting elements 71 and 73 of the connecting element 9 are fixed by holding elements 74, 75 FIG.—FIG. 12—at a distance 25 corresponding to the desired boot size.

In order to establish each boot length indicated by the distance 25, on the adjusting element 71 or 73, in the present case on the adjusting element 73, a measuring device 78 is arranged, for example a resistance path 77, which acts together with a sliding contact 79, or another appropriate scanning device, such as a read head or a magnet or a light source when the measuring device 78 is a glass scale or consists of magnets that are spaced from one another by a nonconductor and arranged behind one another in the longitudinal direction, or a capacitive measuring system.

By adjusting the sliding contact 79 along the resistance path 77 each distance 25 can now be established between the toe clamp 7 and the heel clamp 8. The resistance path 77 of the measuring device 78 is connected to one input 83 of a comparator 84. Adjacent to a further input 85 of the same comparator 84 is a reference input memory 86 which, if applicable, can be predetermined or adjusted by an input device 87. This input device 87 comprises input keys 44 which allow for such a setting that an output 88 of the comparator gives no exit signal when the position of the sliding contact 79 on the resistance path 77 equals a set distance 25 or a sole length, which is the same as the sole length basis used to determine the Z-number, i.e. for example 327 mm.

The output 88 of the comparator 84 is connected with a converter 90, for example a ramp generator 91, by a line 89. Adjacent to this converter 90 via a line 92 lies a memory 93 into which for example an output signal at a predetermined level is fed into a line 94 if no difference signal is supplied by the line 89 or the supplied signal by the line 89 equals the basic boot length for the calculation of the Z-number. By means of the input device 87, a Z-number, corresponding to the running ability, the size and the weight, the gender and/or the shinebone head diameter of the user of the coupling device 6, must be preselected in the memory 93.

If the output signal of line 89 deviates from the basic value because of a different boot length and therefore a different position of the sliding contact 79 on the resistance path 77, the Z-number which has been pre-selected in the memory 93 is changed in the converter 90 according to the input signal supplied by line 89 to the value corresponding to the real boot length and this value is conveyed by a line 94 to a processor 95, which may for example store it in memories 96. By activating a key or the monitoring and/or controlling device 31 it is possible to indicate this set basic value of the Z-number in the memory 93, and/or the Z-number value in the memory 96 which corresponds to the appropriate boot length or to the distance 25, on the display field 29, whereby it is even possible that a separate display area 97 is provided for the set nominal Z-number and further display areas 98 are provided for the Z-number adapted to the user according to his boot length.

When adjusting the monitoring and/or controlling device 31 it has to be taken into account that the main display indicates, if at all possible, the Z-number desired by each user in reference to the standard boot length, so that the user is not confused by changes in the Z-number occurring due to different boot sized in relation to the standard boot size, and for example when a boot having a sole length of 350 mm shows the FIG. 6 as Z-number although the respective release mechanism in the toe and heel clamps are to be set at a Z-number of 5, 3 in order to take into account the release force decrease resulting from a longer sole length. The value to be set for the Z-number which can be calculated for each sole length, but should be activated without any long calculating processes, in particular, by technicians in ski shops in order to achieve proper adjustment of the binding, particularly when the ski binding is mounted. In the event that only the Z-number, which has been corrected in accordance with the respective sole length, would be indicated to the user, the latter would at least when first using the binding produced in accordance with the invention, always ask the dealer to properly adjust the ski binding to a Z-number, and the dealer would have to explain the mathematical truth to the client, which is certainly not easy to understand.

The reading of these various indication values may take place by a mode key 99 for example. At the same time, the setting of the proper Z-number in the toe and heel clamp 7, 8 can be monitored by the processor 95, if measuring devices 70 are provided in these two damps to record the prestress force or the release force of the release mechanism 63, for example pressure springs 64.

The measuring signals emitted by the measuring devices 70 are transferred by a line 100 to a comparator 101, adjacent to which by a further input via a line 102 there is a memory element 103, which can be programmed by means of an input device 87 so that the comparator 101 releases into the line 104 a signal according to the preset adjustment values of the release mechanisms 63.

It is, of course, also possible to make provision for several comparators 101 of this type and in particular for each release mechanism 63 its own comparator, wherein also adequate monitoring elements can be provided, for example for the pressure springs 64 to ensure accordingly the same adjustment of the two release mechanisms 63 in the region of the toe and the heel clamp 7, 8.

Furthermore, together with the monitoring and/or controlling device 31 it is possible to monitor the application force or the tight closing of the coupling device 6. Thereby, a measuring device 60 may be associated with the side of the sole or the tip of the boot 3 in the region of the toe clamp. The application force of the boot 3 on the holding down device for the sole 67 of the toe clamp 7 can be established by the measuring device, for example a load cell or a wire resistance strain gauge or a similar device. The value measured by the measuring device 60 is then by means of a line 105 supplied to the comparator 106, adjacent to which lies at a further input via a line 107 a memory element 108, in order to establish a difference reading in the comparator 106. This memory element 108 can again be preset accordingly by the input device 87.

The establish comparative value in the comparator 106 is supplied by a line 109 to a processor 95 and from there can be transferred to the display device 28 and can be indicated optionally on this device or in one of the display areas 97, 98 by pressing a mode key 99.

Furthermore, it is also possible to attach the lines 109 and 104 to the inputs of a further comparator 110, in order to carry out additional monitoring or the calculation of the Z-number or the application forces in the processor 95 only when a boot 3 is inserted in the coupling device 31.

It is of course also possible to establish or to monitor by virtue of the measured values any optional other combination of measured values or the operational states of the coupling device. Thus, among other things, it is also possible to monitor continuously the arising forces or the course of the forces of the application force and also in particular the release forces and their changes by means of a measuring device 70 or 60 during the operation of the coupling device, and if required, to evaluate them in the processor 95 or simply to store them in the memory 96.

Thereby it is advantageous that values measured by this method can be used to establish thereafter release values for the release mechanism 63 in the toe clamp 7 or the heel clamp 8, so that, if applicable, certain functions of the coupling device, such as for example a release of the release mechanism 63 can be calculated and if required, monitored by means of these measured values.

Figure 14:
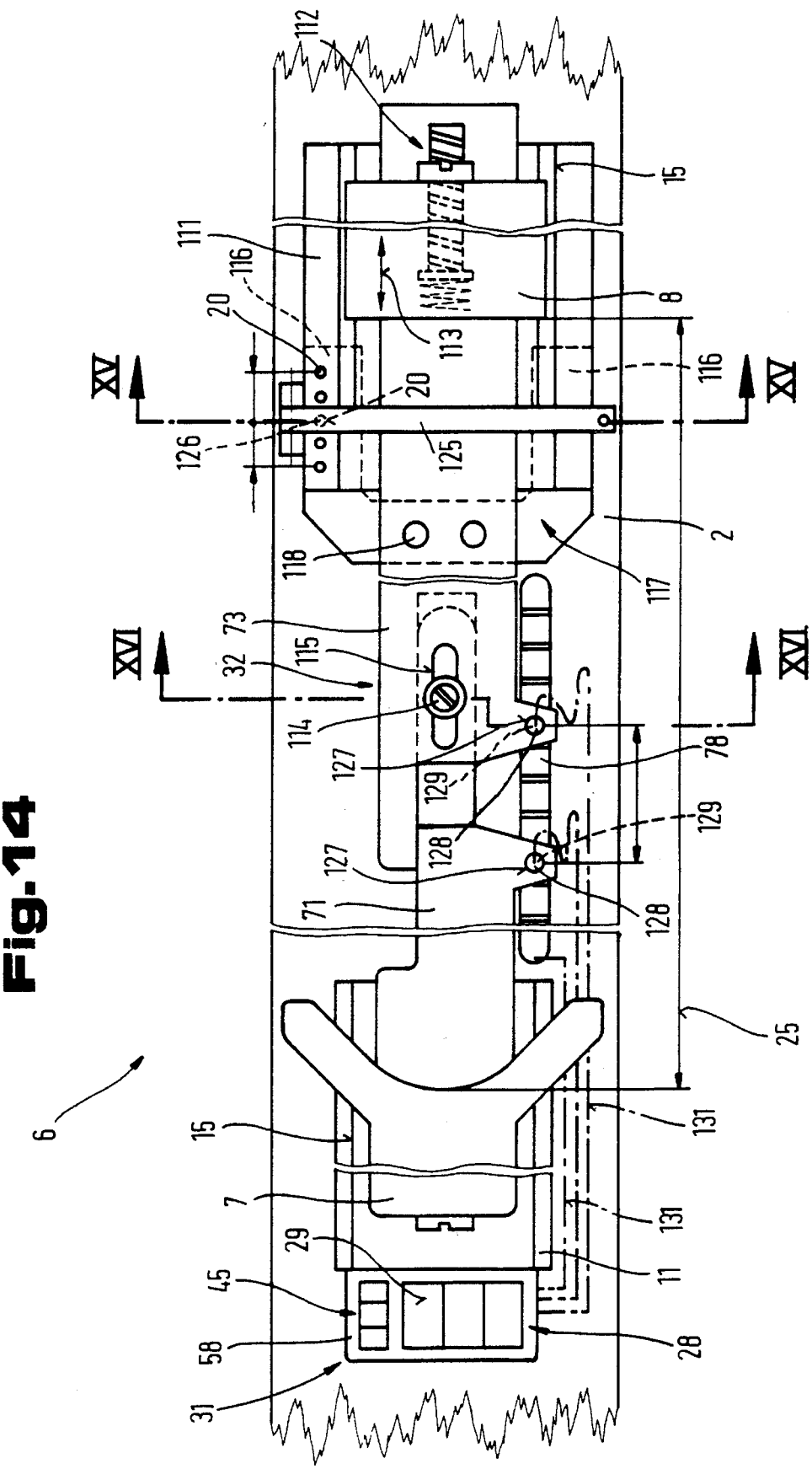
FIG. 14 is a top view of another embodiment of a monitoring and/or controlling device in accordance with the invention for a coupling device adjustable to size.
Figure 15:
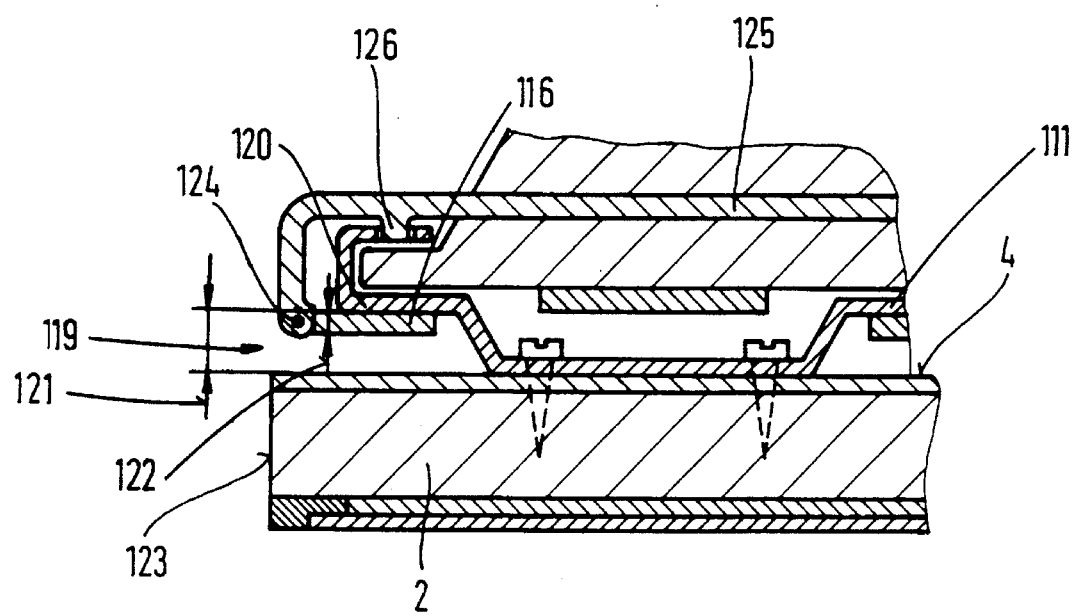
FIG. 15 is a front view of a part of the coupling device according to FIG. 14, in a section taken along the lines XV—XV in FIG. 14.
Figure 16:
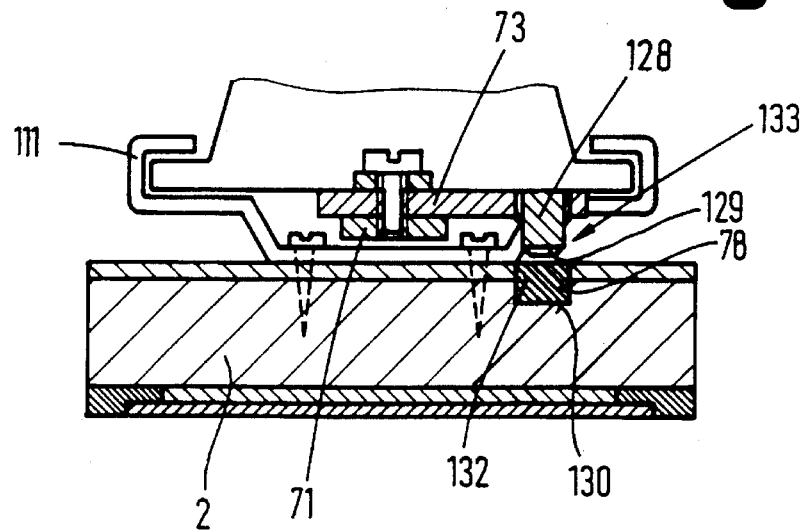
FIG. 16 is a front view of a part of the monitoring and/or controlling device, in a section taken along the lines XVI—XVI in FIG. 14.

FIG. 14 to 16 show a further embodiment of a monitoring and/or controlling device 31 of a coupling device 6. The guiding element 11 for the toe clamp 7 is fastened to the surface 4 of the ski 2. At a distance from it a lengthwise guiding element 111 for the heel clamp 8 is arranged on the surface 4 in the longitudinal direction of the ski 2 and fixed to the ski 2. The toe clamp 7 and the heel clamp 8 are connected for common movement in the longitudinal direction of the ski 2 by adjusting elements 71, 73 provided with the lengthwise adjusting device 32. The heel clamp 8 is adjustable relative to the adjusting element 73 in the direction of a double arrow 113 by means of a screw spindle drive 112, which allows for precise adjustment of the distance 25. The setting of the distance 25 for different boot sizes occurs generally by a lengthwise adjusting device 32, for which purpose clamping screw 114 which frictionally connects the adjusting elements 71, 73, is loosened to displace them relative to one another, one of the adjusting elements, in the present embodiment the adjusting element 73, defining a longitudinal slot 115 holding screw 114.

On the adjusting element 73 facing the surface 4 is a fork-shaped spacing element 117 with shanks 116 protruding into the region of the lengthwise guiding element 111, which, for example, is fastened by rivets 118. The shanks 116 of the spacing element 117 protrude into a free space 119 between the surface 4 and a shank 120 formed by a step portion of the lengthwise guiding element 111, running transverse to the longitudinal direction of the ski, which results in that a distance 121 measured in the perpendicular direction to the surface 4 between the shank 120 and the latter is greater than a thickness 122 of the shank 116 of the spacing element 117.

A swivel pin 124 running parallel to a side edge 123 connects shank 116 with a stopping element 125 extending transverse to the longitudinal direction of the ski, which, when in a stopping position, engages with stopping pin 126 located on the stopping element 125 facing in the direction of the surface 4, in the openings 20 of the lengthwise guiding element 111.

By virtue of the arrangement in the longitudinal direction of several openings 20 being spaced from one another, the spacing element 117 and therefore, the adjusting element 73 which is connected with it, can now be moved in the longitudinal direction of the ski and connected with the lengthwise guiding element 111 by means of the stopping pin 126. This enables the adjustment of the coupling device 6 relative to the ski 2.

The adjusting elements 71, 73 comprise receiving chamber 127 for the measuring device 128, which, with a contact element 129 point into the direction of the surface 4 of the ski 2. In a recess 130 running in the longitudinal direction of the ski 2, the measuring device 78 is arranged, which is scanned by the contact element 129. Lines 131 are leading from the measuring devices 128 to the housing 58, which is arranged on the surface 4 in the region between the toe clamp 7 in the direction of the leading end of the ski and which comprises the display device 28 and if required, function keys 45.

In the present example the measuring device 78 consists of a series of magnets 132 which are separated by a dielectric, with for example, a plus polarity, which are opposed without contact, for example by a minus-poled magnet 133 forming the contact element 129.

If the distance 25 between the toe clamp 7 and the heel clamp 8 is changed by means of the lengthwise adjusting device 32 and also, if the position of the entire coupling device 6 is changed through the spacing element 117, it is now possible to establish by means of the alternating field potential between the magnet 132 and the magnet 133 in the evaluation system 62 of the monitoring and/or controlling device 31, the change of the distance 25 and also the change of the position of the entire coupling device 6 with reference to a fixed reference point and to indicate the respective pieces of information in the display field 29. The function keys 45 may serve to establish the indicating method, which enables the user to call forward one after the other, the required pieces of information such as position, and distance between the toe damp 7 and the heel damp 8.

Instead of the magnets 132 constituting the measuring device 78 and the magnet 133 for the scanning, optical length measuring systems, electrical length measuring systems, such as glass scales, resistance paths etc. or when rotating adjusting parts are used, shaft encoders can also be employed. Since these components are mostly not very high, it is possible to arrange them directly on the surface 4 of the ski 2 so that a recess 130, which influences the rigidity of the ski, is not required.

Figure 17:
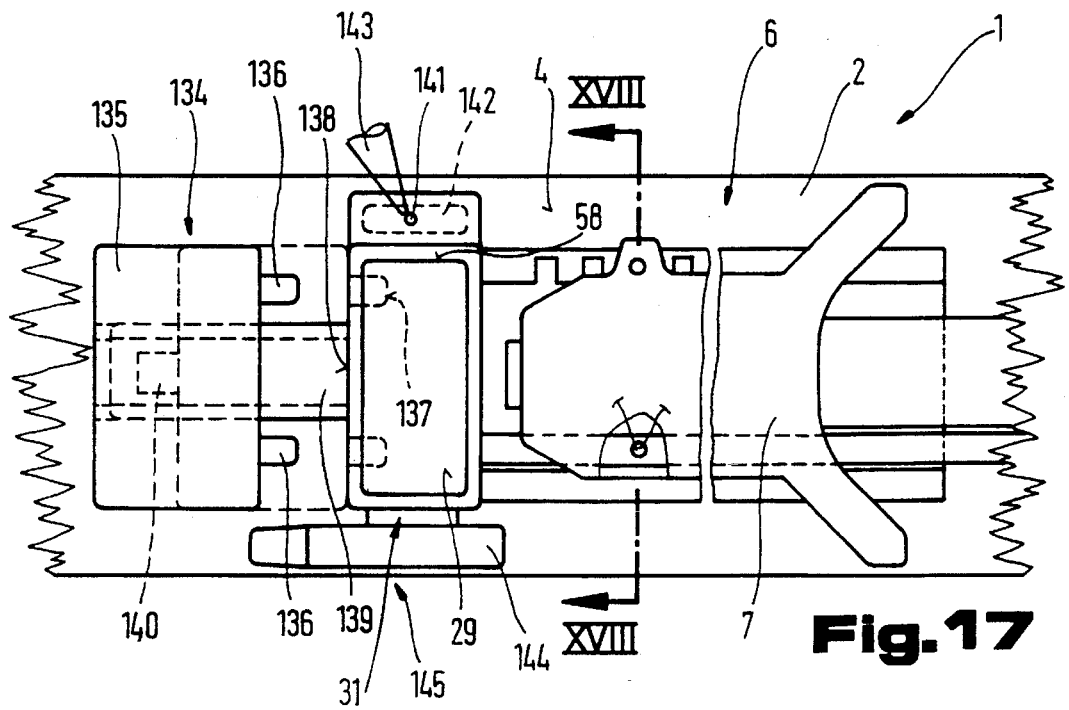
FIG. 17 is a top view of a part of a further embodiment of the monitoring and/or controlling device with an energy storage.

FIG. 17 shows a embodiment for the energy supply of the monitoring and/or controlling device 31. In this embodiment an energy storage element 134 is inserted, for example an accumulator 135 which is rechargeable by inserting plugs 136 into socket contacts 137 that are arranged in a front face 138 of the housing 58 of the monitoring and/or controlling device 31.

In order to achieve a secure support of the energy storage element 134, provision is made in addition for a guiding element 139 on the surface 4 of the ski 2, which consists of a dovetail guide. Of course, a further safety device in the form of a blocking device 140 can also be provided to avoid any accidental detachment of the energy storage element 134.

As can be seen in addition, it is also possible to supply electrical energy to a memory element 142, which is associated with the monitoring and/or controlling device 31 by a contact area 141, for example by means of a pole 143. Thus, in cases of need, the required energy can be supplied for the operation of the monitoring and/or controlling device 31 for a short period of time.

In addition, the monitoring and/or controlling device 31 can be designed to establish the relative velocity of the piece of sports apparatus 1 regarding the surrounding air for which on the surface 4 or the housing 58 a Venturi tube 144 of a speed measuring device 145 can be arranged.

Figure 18:
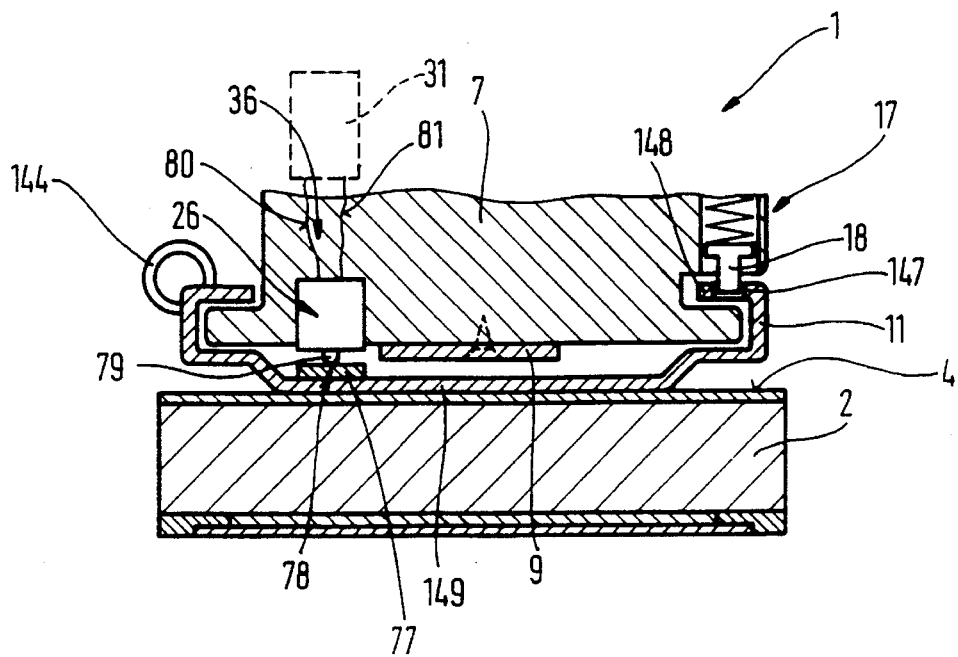
FIG. 18 is a front view of the monitoring and/or controlling device, in a section taken along the lines XVIII—XVIII in FIG. 17.

FIG. 18 shows another embodiment of the position measuring and checking device 36 of the monitoring and/or controlling device 31, wherein the toe clamp 7 being positioned in a longitudinally displaceable manner on the guiding element 11 which is fixed to the surface 4 of the ski 2, comprises the fixing device 17 with a stopping device 18 that engages in the openings 147 of one shank 148 of the guiding element 11. The measuring device 78, which forces toe clamp is arranged on a base shank 149 of the guiding element 11.

The measuring device 26 and its sliding contact 79, which scans the resistance path 77 of the measuring device 78, is arranged in the toe clamp and connected by lines 80, 81 with the monitoring and/or controlling device 31, as shown by broken lines.

This embodiment allows for a retrofitting of the monitoring and/or controlling device 31 in the piece of sports apparatus because the device can be mounted without providing recesses on the ski 2 or the guiding elements 11.

Figure 19:
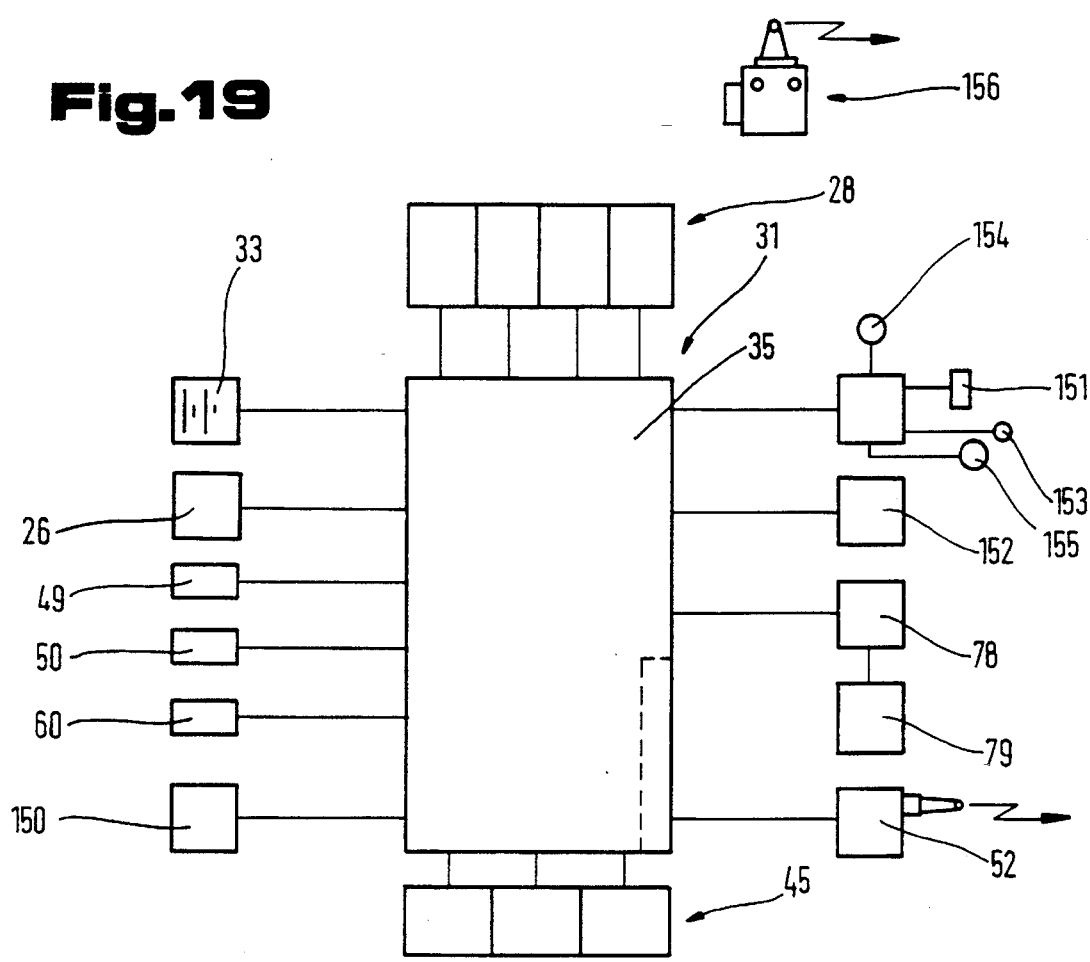
FIG. 19 is a schematic illustration of a circuit diagram of another embodiment of a monitoring and/or controlling device in accordance with the invention.
Figure 20:
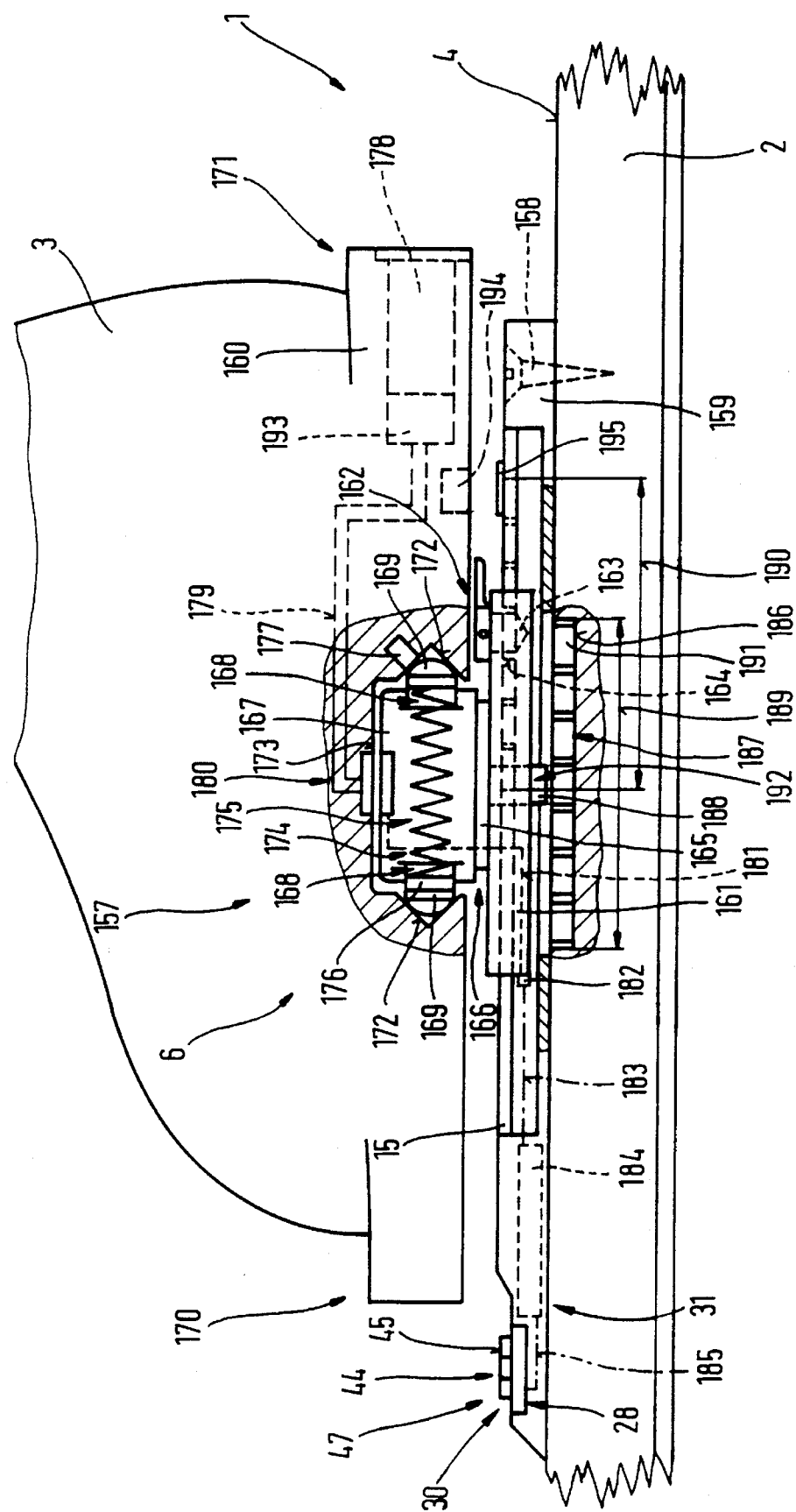
FIG. 20 is a schematically simplified illustration of another embodiment of a monitoring and/or controlling device in accordance with the invention with a central coupling device.

FIG. 19 shows a simplified block connection diagram of the monitoring and/or controlling device 31. The monitoring and/or controlling device 31 is supplied with electric energy by an energy source 33. In addition to the measuring devices 26, the contact elements 49, light sensors 50, measuring devices 60, measuring device 78 with the sliding contact 79, a time function can also be carded out by a timing generator 150. Further sensors 151 and 153 can also detect the temperature, air pressure, altitude and/or inclination as well as the direction by means of a compass 154 or a navigation system 155, so that together with the monitoring and/or controlling device 31 compass and navigation function can also be carded out. A transmitting and receiving device 52 makes it also possible to emit or receive radio range beams through a wireless connection, thus giving a chance for example to find a ski 2 lost in deep snow by means of a portable detector 156. This provides also the possibility for quick help in case the user of the piece of sports apparatus 1 has been buried under avalanches. FIG. 20 shows a further embodiment of a coupling device 6 for the piece of sports apparatus 1, in particular the ski 2 with the monitoring and/or controlling device 31. In order to attach the boot 3 the ski comprises the coupling device 6, for example a central ski binding 157.

This ski binding 157 has a receiving plate 159 arranged in a fixed manner on a surface 4 of the ski 2 by fastening means 158, which facing towards a sole 160 of the boot 3 forms the guideway 15 for a sliding element 161 positioned in it in a lengthwise displaceable manner.

In the sliding element 161 and connected thereto, a fixing device 162 is arranged, which, by means of a stopping element 163 can engage in a releasable manner in the recesses 164 of the receiving plate 159 forming the guideway 15. On the sliding element 161 is, if required, by using a measuring device 165, for example a pressure sensor 166, a housing part 167 arranged, in which coupling elements 168 are stored in a displaceable manner in the longitudinal direction of the ski 2, whereby locking elements 169 of the coupling elements 168 are protruding the housing part 167 in the direction of the toe of the boot 170 and an end of the sole 171, and when coupled with the boot 3 are engaging in recesses 172 of a receiving chamber 173 arranged in the sole 160.

Due to the effect of a prestress device 174, for example a spiral pressure spring, the coupling elements are thereby pressed in the direction of the toe of the boot 170 and the end of the sole 171. If the effect of forces exceeds the holding force of the prestress device 174, the coupling elements 168 are moved towards each other against the effect of the prestress device 174 and the boot 3 released after a preselected release force has been exceeded, which is determined by adjustment of the prestress device 174. Thus, a release device 175 is achieved which decreases any risk of injury.

Between the spiral pressure spring of the prestress device 174 and the coupling element 168, a path and/or force measuring device 176 is arranged by means of which for example the release force which has been predefined by the prestress device 174, can be established.

The coupling element 168 or the locking elements 169 are associated with a switch 177 arranged in the region of the sole 160, which releases the energy supply from an energy source 178 arranged in the sole 160 to the coupling device 6 by means of lines 179 and for example a wireless transmission device 180 arranged between the boot 3 and the coupling device 6, as soon as the boot 3 engages in the coupling device 6. A further line 181 in the housing part 167 and the sliding element 161 and a sliding contact 182 arranged on the sliding element 161 together with a contact path 183, which runs approximately parallel to the guideway 15 being arranged in the receiving plate 159, are now providing the energy supply for a control unit 184 arranged in the receiving plate 159 in the region of the toe of the boot 170, of the monitoring and/or controlling device 31 and connected thereto by a line 185 a display device 28.

A recess 186, arranged in the surface 4 of the ski 2 and running in the longitudinal direction of the ski, accommodates a measuring element 187, which is associated with measuring device 188 that is motionally connected to the sliding element 161, wherein a length 189 of the measuring element 187 corresponds approximately to that of the adjusting area 190.

The measuring element 187 can consist of, for example arranged in the longitudinal direction of the ski and spaced from one another for example by insulators, magnets 191, which without any contact are working together with a measuring device 188 in the sliding element 161, that is formed by an induction sensor 192. By evaluating the signals given by the measuring device 188 in the control unit 184, the relative position of the sliding element 161 can be indicated on the display device 28, for example the LCD display 30 and thereby of the housing part 167 of the coupling device 6 in relation to the ski 2. In addition to this function it is possible to change optionally an indication method by pressing the input keys 44 or function keys 45 of the input device 47, and thus, for example call forward optionally the measured results of the pressure sensor 166, the path and/or force measuring device 176 of the prestress device 174 or one of the battery loading sensors 193 monitoring the loading state of the energy source 178.

As further shown the boot 3 has in the region of the end of the sole 171, for example a code marking 194 which is associated with an inquiry element 195 being supplied by the control unit 184, which allows a justification test, whereby in case of illegal use, an acoustic generator is activated or a locking of the coupling element 168 in its locking position is prevented. This code marking can consist of a dash-code but also of adequate electronic components, which are communicating with the control unit 184.

Furthermore, the code marking 194 and the inquiry element 195 make it possible to call forward the appropriate length of the boot 3. By comparing a projected status with the actual status between the set distance 25 and the length of the boot 3, an automatic adaptation between the toe and heel clamps 7, 8 can be carried out by a servomotor which is operationally connected with an adjusting device 196. However, a fixing of the boot 3 can also be prevented in case the coding does not correspond to the code marking stored in the control unit.

Of course, other pieces of sports apparati 1 than skis, for example snowboards, monoskis, bottom parts of roller skates or skates or similar goods can also be provided with the coupling device 6 or the monitoring and/or controlling device 31 associated therewith.

It is also possible, to interchange components, described in the various embodiments, for the determination of the distance between the toe and the heel damp 7, 8, the position of the binding, the adjustment values required at a certain boot size and for a desired Z-number, and to add optionally some components of one or the other embodiment.

Figure 21:
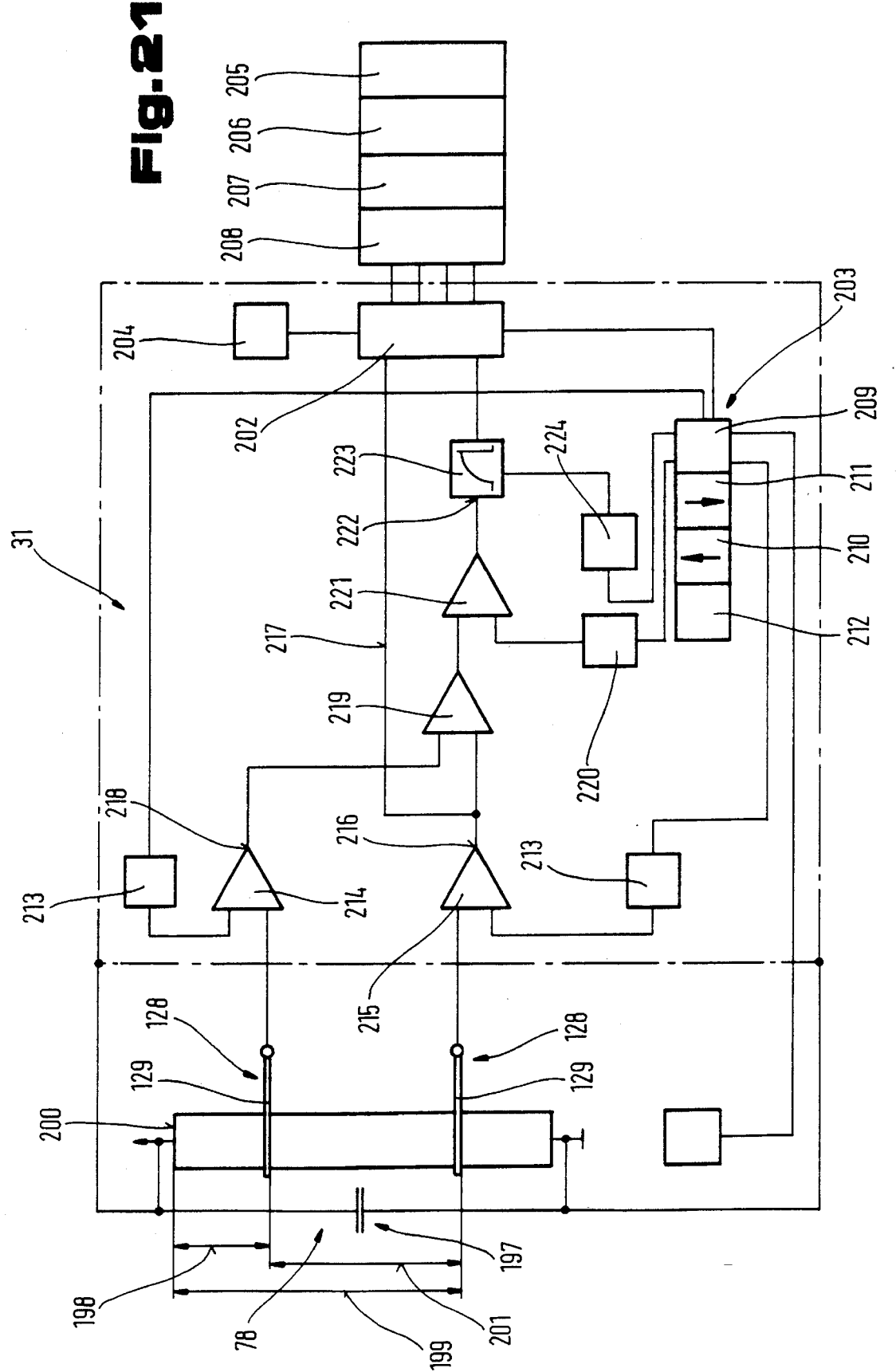
FIG. 21 is a simplified, schematic illustration of a circuit diagram of the monitoring and/or controlling device, in particular according to FIG. 14 to 16.

FIG. 21 shows a circuit diagram of the monitoring and/or controlling device 31, which is preferably used in connection with the piece of sports apparatus illustrated in FIG. 14 to 16.

The schematic circuit diagram shows a measuring device 78, which, for example can consist of a resistance path and illustrates measuring devices 128 or their contact elements 129 associated with the toe clamp or the heel clamp. The linear measuring element formed by the resistance path is connected to a voltage supply device 197 at its outputs. Due to the position of the two contact elements 129 along the measuring device 78, i.e. the resistance bridge, a distance 198 and a distance 199 between the contact elements 129 and a supply station, for example at the end 200 of the measuring device 78 can now be established.

Due to the formation of a difference between the distances 198 and 199, a distance 201 between the contact elements 129 can also be established.

For the establishment of these measured values provision is made for a processor 202, which is connected to an input unit 203 and a memory 204 as well as to indicating elements 205, 206, 207 and 208. The input unit 203 comprises a select key 209, input keys 210, 211 and a memory key 212.

By means of this input unit 203, transducers 213 can be adjusted to a predefined control point, so that in the comparators 214, 215 the position of the contact elements 129 compared to the predefined control points in the transducers 213 can be established.

In the event, for example, that the comparator 215, which, in the drawing, is in contact with the measuring device 128 is associated with the toe clamp 7 and the measuring device 128 associated with the comparator 214 is associated with the heel clamp 8 and if the toe and the heel clamp 7, 8 are connected by a tension band, the position of the toe clamp 77 as well as the position of the entire coupling device 6 relative to the ski 2 can be established by determining the measured value with the comparator 215. For this, an output 216 of the comparator 215 is directly connected to the processor by a line 217, in order to indicate, for example on the indicating element 208 the position of the coupling device 6 in relation to the ski 2, that is to say if the coupling device 6 is arranged precisely in the center along the ski 2 or in a position closer to the leading end of the ski or closer to the rear end of the ski.

By a comparison of the measured values at the output 216 of the comparator 215 and the output 218 of the comparator 214 in a comparator 219, the appropriate distance between the toe and the heel clamp 7, 8, which corresponds to the length of each sole of the boot, can now be determined. Since the proper adjustment for the adaptation of the adjustment values of the coupling device 6, as already defined hereabove, depend on the running ability of the skier or the size of his body and relate to a predefined boot size, each adjustment value on the binding is indeed changing with different boot sizes in relation to the desired Z-number.

In order to carry out this adjustment in a simpler way in the shop and to enable the skier to check this adjustment at all times, the corresponding size of the boot length for which the calculated Z-number is applicable, can now be set by the input device 203 in the processor 202 or a memory 220. This predefined value of the distance between the toe or the heel clamp 7, 8 which equals the Z-number calculation based on the sole length of the boot, is compared in a comparator 221 with the actual measured value, i.e. with the real sole length between the toe and the heel clamp 7, 8 so that at the output of the comparator 221, which lies at the input 222 of a ramp generator 223, so that the deviation of the sole length from the sole length on which the Z-number calculation is based, is provided.

It is now possible to preselect in a memory 224 with input elements a Z-number corresponding to the weight, the tibia diameter as well as the running ability by means of the input unit 203. Depending on the deviation value measured at the input 222 of the ramp generator, the preselected Z-number in the memory 224 is changed in the ramp generator, that is to say the greater the sole length of the boot the smaller the Z-number and the smaller the sole length of the boot the higher the Z-number. This changed and indeed corresponding to real length of the boot between the toe and the heel clamp 7, 8 value of the Z-number, can now be read from the indicating element 207. The actual Z-number set according to the memory 224 can be indicated for example on the indicating element 206, in order to compare the change in the Z-number in a visible manner.

In addition, the real sole length of the ski boot can also be shown on the indicating element 205. However, it is also possible to indicate by means of proper selection elements any other optional measured value such as for example the temperature, height, running speed, the weight of the user when the supporting area of the ski boot on the ski is associated with the appropriate weight sensors as well as other measured values mentioned above in the description.

Finally, it should be noted that the components shown in the drawings are mostly illustrated in a simplified way and not true-to-scale. Individual features of the illustrated and described combinations may also present their own inventive solutions.

In particular, the individual embodiments shown in FIG. 1–5; 6, 7; 8; 9, 10; 11–13; 14–16; 17, 18; 19; 20; 21 may also present their own inventive solutions. The respective objects and solutions regarding these embodiments can be seen from the detailed descriptions of these figures.

What is claimed is:

1. An adjustable coupling device for coupling a boot having a toe and a heel to a sports apparatus, which comprises (a) a toe clamp, (b) a heel clamp, (c) guiding elements connected to the sports apparatus and defining a guideway for the toe and heel clamps for displacement of the clamps in a longitudinal direction, (d) a longitudinally adjustable band-shaped connecting element connecting the toe and heel clamps to each other for common displacement along the guideway, (e) an adjusting device for lengthwise adjustment of the connecting element to maintain the toe and heel clamps at an adjusted distance from each other, (f) a fixing device including
   (1) a stopping element and
   (2) several longitudinally spaced openings in one of the guiding elements, each of the openings defining a preset fixed position of one of the clamps upon engagement of the stopping element with a respective one of the openings, and (g) a monitoring device indicating a zero position and including
   (1) a display device,
   (2) an electric energy source, and
   (3) a measuring device adjacent each one of the openings and generating a signal upon engagement by the stopping element in the respective opening, the measuring device being electrically connected to the energy source and the display device whereby the signal is transmitted to the display device to display a respective one of the fixed positions and the fixed position in relation to the indicated zero position.

2. The adjustable coupling device of claim 1, wherein the measuring device comprises switches actuatable by the stopping element.

3. The adjustable coupling device of claim 1, wherein the measuring device is mounted on the sports apparatus.

4. The adjustable coupling device of claim 3, wherein the stopping element is mounted on the one clamp.

5. The adjustable coupling device of claim 3, wherein the stopping element is mounted on the connecting element.

6. The adjustable coupling device of claim 1, further comprising an intermediate plate between the sports apparatus and the coupling device, the monitoring device being mounted on the intermediate plate.

7. The adjustable coupling device of claim 6, wherein the intermediate plate defines a receiving chamber housing the energy source.

8. The adjustable coupling device of claim 1, further comprising a position measuring and checking device connected to the measuring device for receiving the signal.

9. The adjustable coupling device of claim 8, further comprising a release mechanism connected to at least one of the clamps and applying a pre-adjustable pre-stress force to the boot between one of the clamps which is stationary on the sports apparatus and the other clamp which is displaceable along the guideway against the pre-stress force, and a force measuring device indicating a force required to overcome the pre-stress force and to release the boot.

10. The adjustable coupling device of claim 9, wherein an output of the position measuring and checking device is connected to an input of a detection device, and the force measuring device is connected to another input of the detection device and having an output connected to the display device for indicating the release force in dependence of the distance between the clamps.

11. The adjustable coupling device of claim 10, wherein the release force, at a predetermined standard distance between the clamps and starting from a desired release force, decreases with an increase in the distance between the clamps and increases with a decrease in said distance.

12. The adjustable coupling device of claim 10, wherein respective ones of the detection and force measuring devices are mounted on a respective one of the clamps.

13. The adjustable coupling device of claim 1, further comprising an input device including a function key and at least one input key selectively connecting an output of an evaluation device to the display device.

14. The adjustable coupling device of claim 1, wherein the monitoring device comprises a further measuring device associated with the adjusting device and generating a signal in response to a lengthwise adjustment of the connecting element, the further measuring device being electrically connected to the energy source and the display device whereby the generated signal is transmitted to the display device to display the adjusted distance between the toe clamp and the heel clamp.

15. The adjustable coupling of claim 14, wherein the connecting element comprises two parts movable lengthwise relative to each other, the two parts being connectable to each other at the adjusted distance, and the further measuring device comprises a sliding contact cooperating with a resistance path for generating the signal.

16. The adjustable coupling of claim 14, wherein the connecting element comprises two parts movable lengthwise relative to each other and being flexible in a direction extending perpendicularly to a surface of the sports apparatus, the lengthwise adjusting device interconnects the two flexible connecting element parts, and the further measuring device is arranged between the two parts.

17. The adjustable coupling of claim 14, wherein the energy source comprises a solar cell arrangement on a surface of the sports apparatus.

18. The adjustable coupling of claim 14, further comprising a comparator receiving the generated signal from an output of the further measuring device for comparing the adjusted distance with a pre-set desired value, the comparator transmitting different signals to the display device, depending on whether the generated signal conforms to, or differs from, the desired value.

19. The adjustable coupling of claim 14, wherein the further measuring device comprises a series of magnets arranged successively on the sports apparatus in the longitudinal direction and an induction sensor arranged on a respective one of the clamps.

20. The adjustable coupling of claim 14, wherein the further measuring device comprises a code marking on the boot and a code marking sensor arranged on a respective one of the clamps.

21. The adjustable coupling of claim 1, further comprising a weight measuring device arranged between the sports apparatus and the boot, the weight measuring device generating a weight signal and being connected to the energy source and the display device.

22. The adjustable coupling of claim 1, further comprising a speed measuring device generating a signal indicating the speed of the sports apparatus and connected to the energy source and the display device.

23. The adjustable coupling of claim 1, further comprising a temperature measuring device generating a signal indicating the ambient temperature and connected to the energy source and the display device.

24. The adjustable coupling of claim 1, further comprising a radio transmitter/receiver connected to the monitoring device.

25. The adjustable coupling of claim 1, wherein the energy source and the devices of the monitoring device are connected by electrically conductive synthetic resin layers on the sports apparatus.

26. A pair of skis, each ski comprising an adjustable coupling device for coupling a boot having a toe and a heel to the ski, each coupling device comprising
   (a) a toe clamp,
   (b) a heel clamp,
   (c) guiding elements connected to the ski and defining a guideway for the toe and heel clamps for displacement of the clamps in a longitudinal direction,
   (d) a longitudinally adjustable band-shaped element connecting the toe and heel clamps to each other for common displacement along the guideway,
   (e) an adjusting device for lengthwise adjustment of the connecting element to maintain the toe and heel clamps at an adjusted distance from each other,
   (f) a fixing device including
      (1) a stopping element and
      (2) several longitudinally spaced openings in one of the guiding elements, each of the openings defining a preset fixed position of one of the clamps upon engagement of the stopping element with a respective one of the openings, and
   (g) a monitoring device indicating a zero position and including
      (1) a display device,
      (2) an electric energy source, and
      (3) a measuring device adjacent each one of the openings and generating a signal upon engagement by the stopping element in the respective opening, the measuring device being electrically connected to the energy source and the display device whereby the signal is transmitted to the display device to display a respective one of the fixed positions and the fixed position in relation to the indicated zero position, and further comprising
   (h) a signal transmitter connecting the monitoring devices of the skis.

27. An adjustable coupling device for coupling a boot having a toe and a heel to a sports apparatus, which comprises
   (a) a toe clamp,
   (b) a heel clamp,
   (c) guiding elements connected to the sports apparatus and defining a guideway for the toe and heel clamps for displacement of the clamps in a longitudinal direction,
   (d) a longitudinally adjustable band-shaped connecting element connecting the toe and heel clamps to each other for common displacement along the guideway,
   (e) an adjusting device for lengthwise adjustment of the connecting element to maintain the toe and heel clamps at an adjusted distance from each other,
   (f) a fixing device including
      (1) a stopping element and
      (2) several longitudinally spaced openings in one of the guiding elements, each of the openings defining a preset fixed position of one of the clamps upon engagement of the stopping element with a respective one of the openings, and
   (g) a monitoring device indicating a zero position and including
      (1) a display device,
      (2) an electric energy source, and
      (3) a measuring device generating signals indicating engagement by the stopping element in the respective opening and the lengthwise adjustment of the connecting element, the measuring device being electrically connected to the energy source and the display device whereby the generated signals are transmitted to the display device to display a respective one of the fixed positions and the fixed position in relation to the indicated zero position as well as the adjusted distance between the toe clamp and the heel clamp.

* * * * *